United States Patent
Song et al.

(10) Patent No.: US 7,292,303 B2
(45) Date of Patent: Nov. 6, 2007

(54) LIQUID CRYSTAL DISPLAY AND PANEL THEREFOR INCLUDING REGULAR AND SUCCESSIVE REGULAR DOMAIN DEFINING MEMBERS

(75) Inventors: Jang-Kun Song, Seoul (KR); San-Seong Seomun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 10/880,569

(22) Filed: Jul. 1, 2004

(65) Prior Publication Data

US 2005/0030459 A1    Feb. 10, 2005

(30) Foreign Application Priority Data

Jul. 2, 2003 (KR) ............... 10-2003-0044577
Jul. 15, 2003 (KR) ............... 10-2003-0048289

(51) Int. Cl.
    *G02F 1/1343* (2006.01)
(52) U.S. Cl. ............................................. 349/141
(58) Field of Classification Search .............. 349/123, 349/129, 141
    See application file for complete search history.

(56) References Cited

U.S. PATENT DOCUMENTS

| | | | |
|---|---|---|---|
| 5,309,264 A * | 5/1994 | Lien et al. | 349/143 |
| 6,466,288 B1 | 10/2002 | Rho | |
| 6,633,360 B2 * | 10/2003 | Okada et al. | 349/145 |
| 6,657,695 B1 * | 12/2003 | Song et al. | 349/143 |
| 6,710,836 B2 * | 3/2004 | Lee | 349/141 |
| 6,784,965 B2 * | 8/2004 | Kim et al. | 349/141 |
| 2003/0071951 A1 * | 4/2003 | Jun | 349/129 |
| 2003/0202146 A1 * | 10/2003 | Takeda et al. | 349/129 |
| 2003/0210372 A1 * | 11/2003 | Song | 349/130 |
| 2004/0075799 A1 * | 4/2004 | Lin | 349/130 |
| 2004/0125295 A1 * | 7/2004 | Kim et al. | 349/129 |

FOREIGN PATENT DOCUMENTS

| | | |
|---|---|---|
| JP | 2000-155317 | 6/2000 |
| JP | 2001-215515 | 8/2001 |
| JP | 2002-014350 | 1/2002 |
| KR | 10-1999-0079365 | 11/1999 |
| KR | 1020000009518 | 2/2000 |
| KR | 1020020015005 | 2/2002 |
| KR | 1020020044293 | 6/2002 |
| KR | 2002-0084097 | 11/2002 |
| KR | 1020030028699 | 4/2003 |
| KR | 1020030030822 | 4/2003 |

* cited by examiner

*Primary Examiner*—David Nelms
*Assistant Examiner*—Timothy L Rude
(74) *Attorney, Agent, or Firm*—F. Chau & Assoc., LLC

(57) ABSTRACT

A thin film transistor array panel is provided, which includes: a substrate; a first signal line formed on the substrate; a second signal line formed on the substrate and intersecting the first signal line; a thin film transistor connected to the first and the second signal lines; a pixel electrode connected to the thin film transistor; a regular domain defining member partitioning the pixel electrode into a plurality of partitions; and a subsidiary domain defining member extending substantially parallel to the regular domain defining member and disposed near edge or middle of the partitions.

20 Claims, 27 Drawing Sheets

LIQUID CRYSTAL DISPLAY AND PANEL THEREFOR INCLUDING REGULAR AND SUCCESSIVE REGULAR DOMAIN DEFINING MEMBERS

BACKGROUND OF THE INVENTION

1. Field of the Invention

The present invention relates to a liquid crystal display and a panel therefor.

2. Description of the Related Art

A liquid crystal display (LCD) is one of the most widely used flat panel displays. LCDs are used in notebook or laptop computers, desktop computer monitors and televisions. LCDs are lightweight and occupy less space than conventional cathode ray tube (CRT) displays.

An LCD generally includes a liquid crystal (LC) layer that is interposed between a pair of panels including field-generating electrodes such as pixel electrodes and a common electrode. The LC layer is subjected to an electric field generated by the field-generating electrodes and variations in the field strength change the molecular orientation of the LC layer. For example, upon application of an electric field, the molecules of the LC layer change their orientation to change polarization of incident light. Appropriately arranged polarizers partially or fully block the light, creating gray or dark areas that can represent desired images.

One measure of LCD quality is a standard viewing angle that is defined as a viewing angle giving a predetermined contrast ratio. Various techniques for enlarging the standard viewing angle have been suggested, including a technique utilizing a vertically aligned LC layer and providing cutouts or protrusions at pixel electrodes. The cutouts or the protrusions cause horizontal components in the electric field or pretilt in the LC molecules, which can determine tilt directions of the LC molecules, or and thus appropriately arranged cutouts or protrusions give various tilt directions to the LC molecules, thereby increasing the standard viewing angle.

However, the above-described LCD has a poor response time. Although the LC molecules near the cutouts or protrusions rapidly tilt in a direction in response to a strong horizontal component of the electric field, the LC molecules far from the cutouts or protrusions may experience a weak horizontal component and may not rapidly determine their tilt directions. As a result, the LC molecules far from the cutouts or protrusions may be tilted by push or collision by adjacent molecules.

The response time may be improved by making the distance between the cutouts or the protrusions.

However, the cutouts and the protrusions reduce the aperture ratio, and the aperture ratio is further decreased by approaching the cutouts or the protrusions. To increase aperture ratio, it has been suggested that the size of the pixel electrodes be maximized. However, maximization of the size of the pixel electrodes results in a close distance between the pixel electrodes, causing strong lateral electric fields between the pixel electrodes. The strong electric fields cause unwanted altering of the orientation of the LC molecules, yielding textures and light leakage and deteriorating display characteristics.

SUMMARY OF THE INVENTION

A motivation of the present invention is to solve the problems of the conventional art.

A thin film transistor array panel is provided, which includes: a substrate; a first signal line formed on the substrate; a second signal line formed on the substrate and intersecting the first signal line; a thin film transistor connected to the first and the second signal lines; a pixel electrode connected to the thin film transistor; a regular domain defining member partitioning the pixel electrode into a plurality of partitions; and a subsidiary domain defining member extending substantially parallel to the regular domain defining member and disposed near edge or middle of the partitions.

The second signal line may include a plurality of curved portions and intermediate portions intersecting the first signal line and alternately arranged by a predetermined interval.

Each of the curved portions of the data lines may include at least a pair of rectilinear portions connected to each other and making an angle of about 45 degrees.

The regular domain defining member may have an inversion symmetry with respect to a transverse line bisecting the pixel electrode into lower and upper portions.

The regular domain defining member may make an angle of about 45 degrees with the first signal line.

The subsidiary domain defining member may include a fine cutout in the pixel electrode, or a protrusion or a stepped portion of a protrusion on the pixel electrode and the regular domain defining member may include a cutout in the pixel electrode or a protrusion on the pixel electrode.

The thin film transistor array panel may further include a third signal line formed on the substrate, extending substantially parallel to the first signal line, and overlapping the pixel electrode or a terminal of the thin film transistor connected to the pixel electrode to form a storage capacitor.

A thin film transistor array panel, which includes: a substrate; a gate line formed on the substrate and including a gate electrode; a gate insulating layer formed on the gate line; a semiconductor layer formed on the gate insulating layer; a data line formed on the semiconductor layer at least in part and including a source electrode; a drain electrode formed on the semiconductor layer at least in part and separated from the data line; a passivation layer formed on a portion of the semiconductor layer; and a pixel electrode connected to the drain electrode and having a fine cutout disposed near edge or middle thereof.

The data line may include a curved portion and an intermediate portion intersecting the gate line, and the curved portion of the data line comprises a pair of portions making a clockwise angle of about 45 degrees and a counterclockwise angle of about 45 degrees with the gate line, respectively.

The pixel electrode may have a curved edge extending substantially parallel to the curved portion of the data line.

The thin film transistor array panel may further include a storage electrode line formed on the substrate, extending substantially parallel to the gate line, and including a storage electrode having an increased width, wherein the drain electrode has an expansion connected to the pixel electrode and overlapping the storage electrode.

The thin film transistor array panel may further include a plurality of color filters formed on or under the first passivation layer. The color filters may extend substantially parallel to the data line and the color filters may include red, green and blue color filters arranged in turn.

Entire bottom surfaces of the data line and the drain electrode may be disposed substantially on the semiconductor layer, the data line and the drain electrode may have substantially the same planar shape as the semiconductor layer, and the semiconductor layer may include a portion that is not covered with the data line and the drain electrode and disposed between the source electrode and the drain electrode.

A common electrode panel, which includes: a substrate; a light blocking member formed on the substrate and defining an open area; a common electrode formed on an entire surface of the substrate; a regular domain defining member partitioning the open area into a plurality of partitions; and a subsidiary domain defining member extending along a shape of the partitions and disposed near edge or middle of the partitions.

The subsidiary domain defining member may include a fine cutout in the common electrode, or a protrusion or a stepped portion of a protrusion on the common electrode, and the regular domain defining member may include a cutout in the common electrode or a protrusion on the common electrode.

A liquid crystal display, which includes: a first substrate; a first signal line formed on the substrate; a second line formed on the substrate and intersecting the first signal line; a thin film transistor connected to the first and the second signal lines; a pixel electrode connected to the thin film transistor; a second substrate facing the first substrate; a common electrode formed on the second substrate; a regular region partitioning member formed on at least one of the first and the second substrates and partitioning the pixel electrode into a plurality of partitions; a subsidiary region partitioning member formed on at least one of the first and the second substrates, extending along a shape of the partitions, and disposed near edge or middle of the partitions; and a liquid crystal layer disposed between the first substrate and the second substrate and partitioned into a plurality of tilt regions disposed on the partitions, respectively.

The liquid crystal layer may have negative dielectric anisotropy and may be subjected to vertical alignment.

The second signal line may have a curved portion, and each of the partitions may have a major edge parallel to the curved portion of the second signal line.

The subsidiary region partitioning member may include a fine cutout in the pixel electrode or the common electrode, or a protrusion or a stepped portion of a protrusion on the pixel electrode or the common electrode.

The fine cutout may have a width ranging about 2 microns to about 5 microns.

The regular region partitioning member may include a cutout in the pixel electrode or the common electrode and the regular region partitioning member may include a protrusion in the pixel electrode or the common electrode.

BRIEF DESCRIPTION OF THE DRAWINGS

The present invention will become more apparent by describing preferred embodiments thereof in detail with reference to the accompanying drawings in which.

DETAILED DESCRIPTION OF PREFERRED EMBODIMENTS

Figure 1:
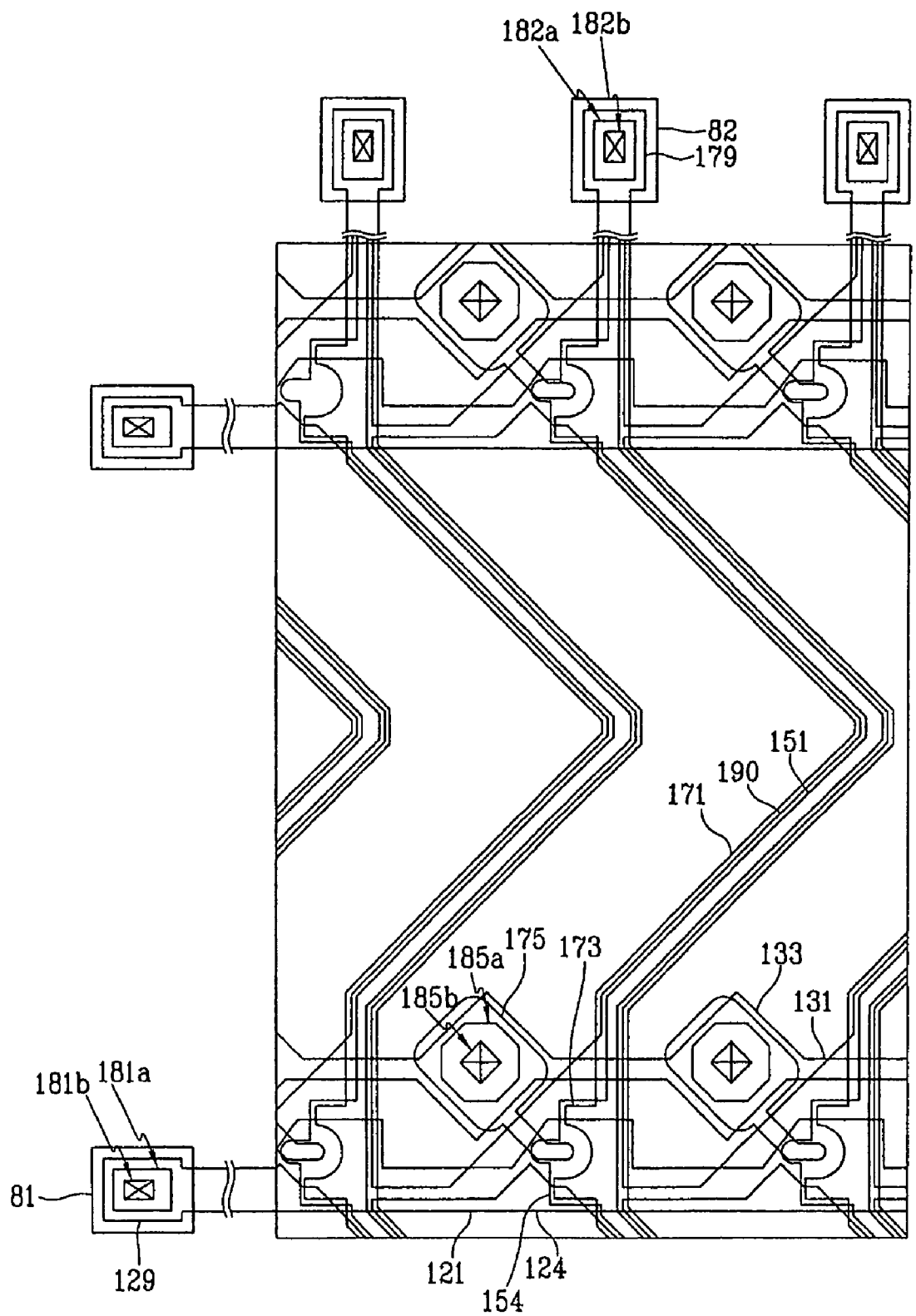
FIG. 1 is a layout view of a TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels therefor according to embodiments of the present invention will be described with reference to the accompanying drawings.

Referring FIGS. 1-5, an LCD according to an embodiment of the present invention is described in detail.

Figure 2:
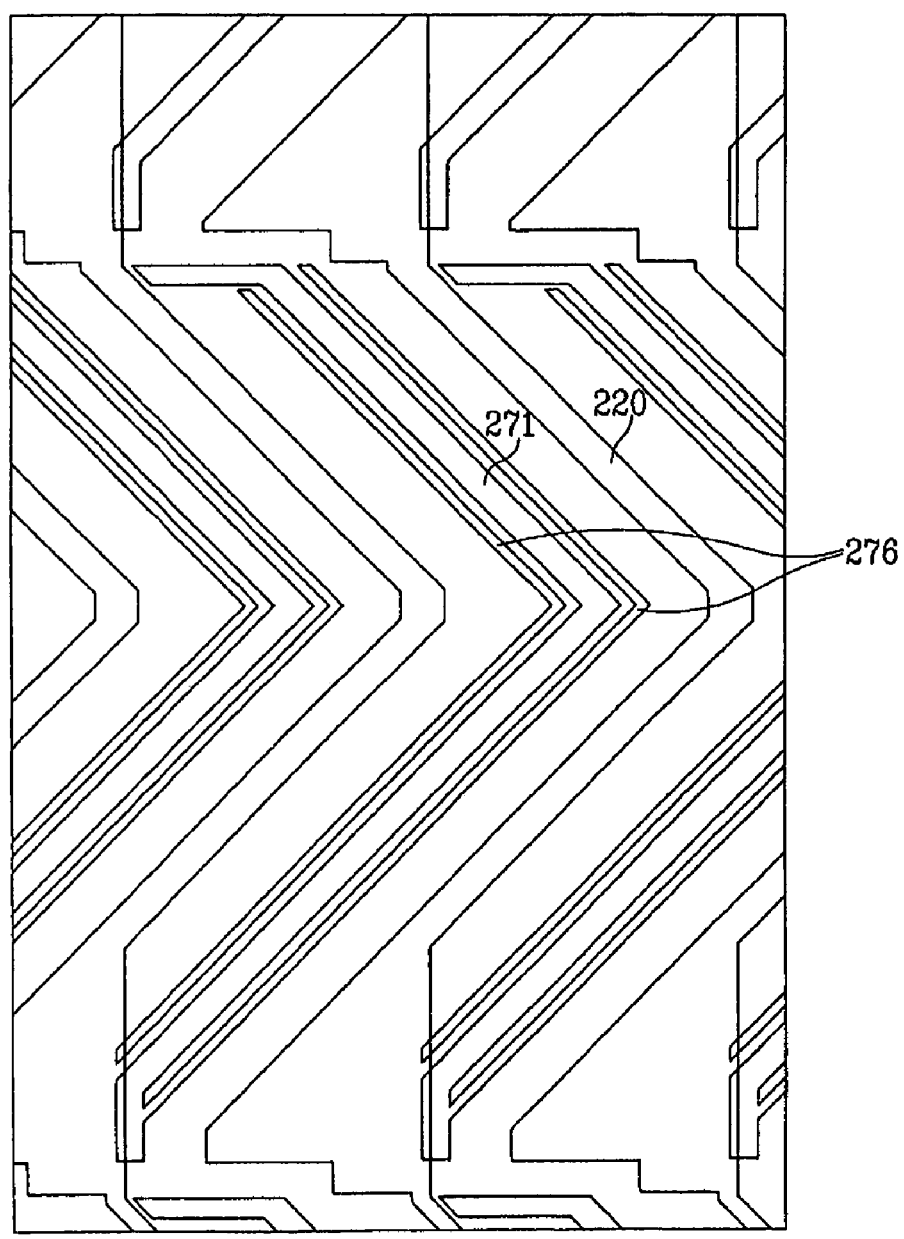
FIG. 2 is a layout view of a common electrode panel for an LCD according to an embodiment of the present invention.
Figure 3:
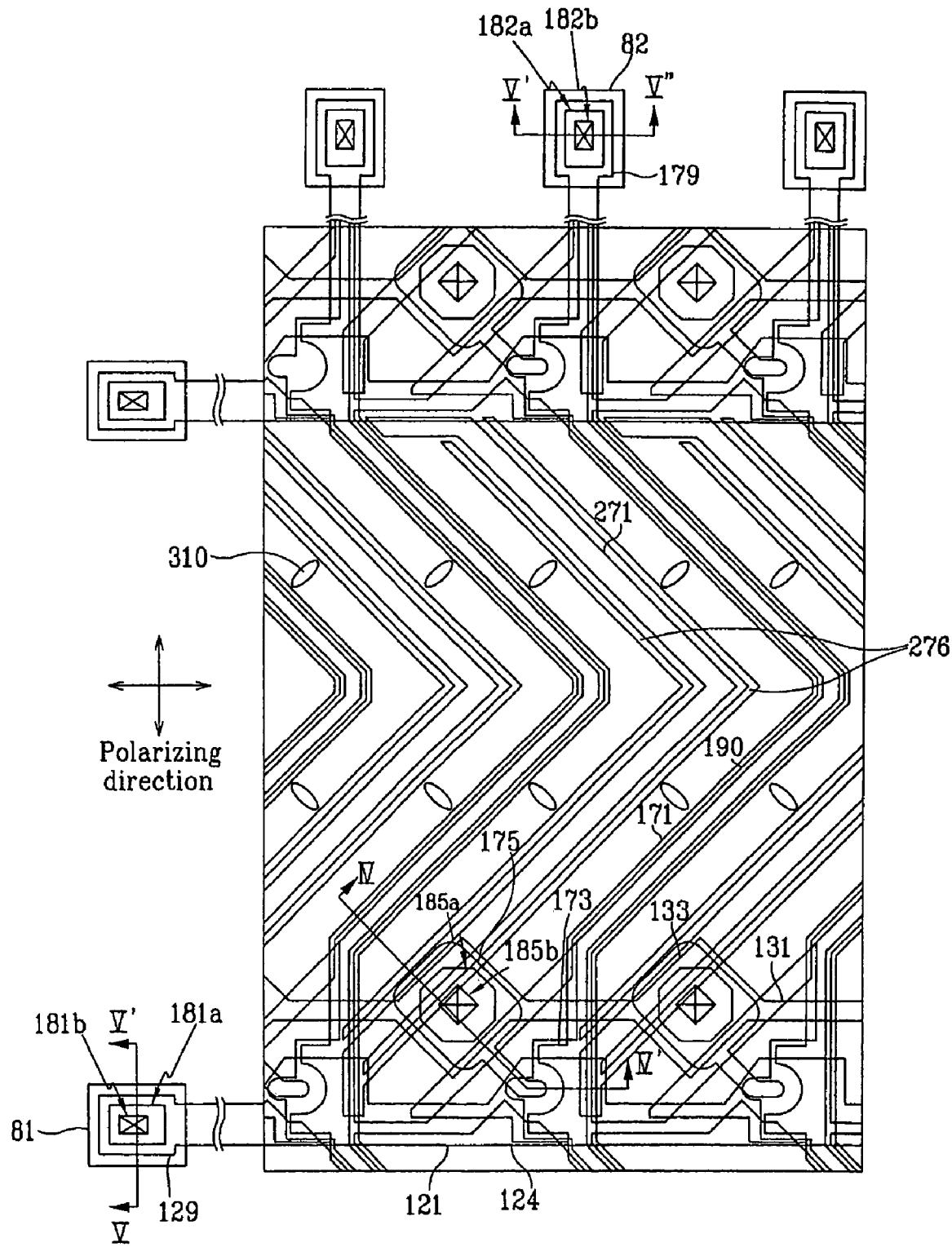
FIG. 3 is a layout view of an LCD including the TFT array panel shown in FIG. 1 and the common electrode panel shown in FIG. 2.
Figure 4:
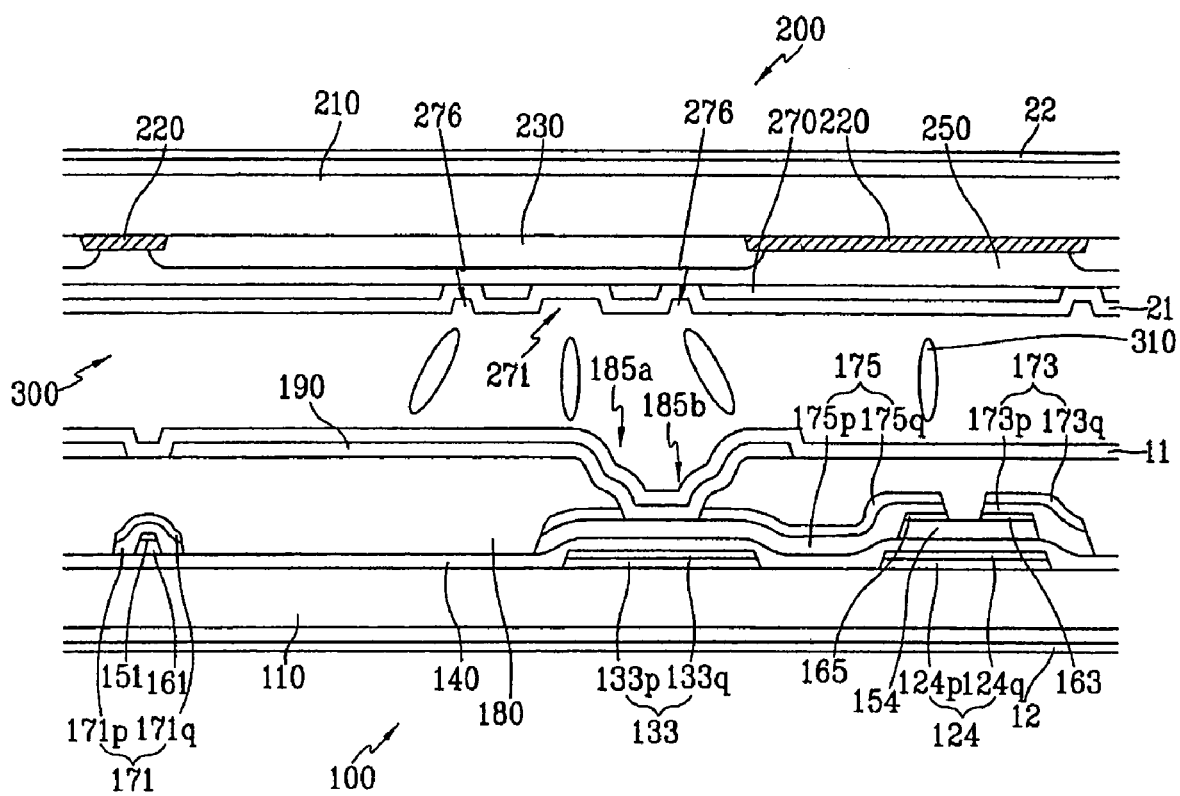
FIG. 4 is a sectional view of the LCD shown in FIG. 3 taken along the line IV-IV'.
Figure 5:
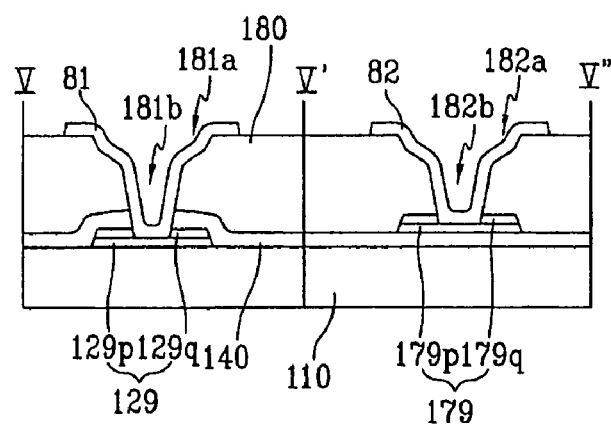
FIG. 5 is a sectional view of the LCD shown in FIG. 3 taken along the lines V-V' and V'-V'''.

FIG. 1 is a layout view of a TFT array panel for an LCD according to an embodiment of the present invention, FIG. 2 is a layout view of a common electrode panel for an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along the line IV-IV', and FIG. 5 is a sectional view of the LCD shown in FIG. 3 taken along the lines V-V' and V'-V".

An LCD according to an embodiment of the present invention includes a TFT array panel 100, a common electrode panel 200 facing the TFT array panel 100, and a LC layer 300 interposed between the TFT array panel 100 and the common electrode panel 200.

The TFT array panel 100 is now described in detail with reference to FIGS. 1, 4 and 5.

A plurality of gate lines 121 and a plurality of storage electrode lines 131 are formed on an insulating substrate 110.

The gate lines 121 extend substantially in a transverse direction and are separated from each other and transmit gate signals. Each gate line 121 includes a plurality of projections forming a plurality of gate electrodes 124 and an expanded end portion 129 having a large area for contact with another layer or an external driving circuit mounted on the substrate 110 or on another device such as a flexible printed circuit film (not shown) that may be attached to the substrate 110. The driving circuit may be integrated on the substrate 110 and the end portion 129 may not have a large area.

Each storage electrode line 131 extends substantially in the transverse direction and is located close to one of two adjacent gate lines 121. However, the storage electrode line may be equidistant from the two adjacent gate lines 121. Each storage electrode line 131 includes a plurality of projections forming storage electrodes 133 and each storage electrode 133 has a shape of a diamond or a rectangle rotated by about 45 degrees. The storage electrode lines 131 are supplied with a predetermined voltage such as a common voltage, which is applied to a common electrode 270 on the common electrode panel 200 of the LCD.

The gate lines 121 and the storage electrode lines 131 have a multi-layered structure including two films having different physical characteristics, a lower film and an upper film. The upper film is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy. In FIG. 4, the lower and the upper films of the gate electrodes 124 are indicated by reference numerals 124$p$ and 124$q$, respectively, the lower and the upper films of the end portions 129 are indicated by reference numerals 129$p$ and 129$q$, respectively, and the lower and the upper films of the storage electrodes 133 are indicated by reference numerals 133$p$ and 133$q$, respectively. Portions of the upper film 129$q$ of the end portions 129 of the gate lines 121 are removed to expose the underlying portions of the lower films 129$p$.

The gate lines 121 and the storage electrode lines 131 may have a single layer structure or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion. The number of the oblique portions connected between adjacent two longitudinal portions may be more than two.

Each drain electrode 175 includes a rectangular expansion overlapping a storage electrode 133. The edges of the expansion of the drain electrode 175 are substantially parallel to the edges of the storage electrodes 133. Each longitudinal portion of the data lines 171 includes a plurality of projections such that the longitudinal portion including the projections forms a source electrode 173 partly enclosing an end portion of a drain electrode 175. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 171$p$ and 175$p$ preferably made of Mo, Mo alloy or Cr and an upper film 171$q$ and 175$q$ located thereon and preferably made of Al containing metal. In FIGS. 4 and 5, the lower and the upper films of the source electrodes 173 are indicated by reference numerals 173$p$ and 173$q$, respectively, and the lower and the upper films of the end portions 179 of the data lines 171 are indicated by reference numerals 179$p$ and 179$q$, respectively. Portion of the upper films 179$q$, 175$q$ of the expansions 179 of the data lines 171 and the drain electrodes 175 are removed to expose the underlying portions of the lower films 179$p$ and 175$p$.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film.

The passivation layer 180 has a plurality of contact holes 182$b$ and 185$b$ exposing the end portions 179 of the data lines 171 and the drain electrodes 175, respectively. The passivation layer 180 and the gate insulating layer 140 have a plurality of contact holes 181$b$ exposing the end portions 129 of the gate lines 121. The contact holes 181$b$, 182$b$ and 185$b$ can have various shapes such as polygon or circle. The area of each contact hole 181$b$ or 182$b$ is preferably equal to or larger than 0.5 mm×15 μm and not larger than 2 mm×60 μm. The sidewalls 181$a$, 182$a$ and 185$a$ of the contact holes 181$b$, 182$b$ and 185$b$ are inclined with an angle of about 30-85 degrees or have stepwise profiles.

A plurality of pixel electrodes 190 and a plurality of contact assistants 81 and 82, which are preferably made of ITO or IZO, are formed on the passivation layer 180.

Each pixel electrode 190 is located substantially in an area enclosed by the data lines 171 and the gate lines 121, and thus it also forms a chevron. The pixel electrodes 190 cover the storage electrode lines 131 including the storage electrodes 133 and the expansions of the drain electrodes 175 and have chamfered edges substantially parallel to edges of the storage electrodes 133 that are close to the chamfered edges.

The pixel electrodes 190 are physically and electrically connected to the drain electrodes 175 through the contact holes 185$b$ such that the pixel electrodes 190 receive the data voltages from the drain electrodes 175. The pixel electrodes 190 supplied with the data voltages generate electric fields in cooperation with the common electrode 270, which reorient liquid crystal molecules 310 disposed therebetween.

A pixel electrode 190 and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131. The capacitances of the storage capacitors, i.e., the storage capacitances are increased by providing the projections (i.e., the storage electrodes) 133 at the storage electrode lines 131, elongating the drain electrodes 175 connected to the pixel electrodes 190, and providing the expansions at the drain electrodes 175 overlapping the storage electrodes 133 of the storage electrode lines 131 for decreasing the distance between the terminals and increasing the overlapping areas.

The pixel electrodes 190 overlap the data lines 171 as well as the gate lines 121 to increase aperture ratio.

The contact assistants 81 and 82 are connected to the exposed end portions 129 of the gate lines 121 and the exposed end portions 179 of the data lines 171 through the contact holes 181$b$ and 182$b$, respectively. The contact assistants 81 and 82 protect the exposed portions 129 and 179 and complement the adhesiveness of the exposed portions 129 and 179 and external devices.

Finally, an alignment layer 11 is formed on the pixel electrodes 190, the contact assistants 81 and 82, and the passivation layer 180.

The description of the common electrode panel 200 follows with reference to FIGS. 2, 4 and 5.

A light blocking member called a black matrix 220 is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A plurality of color filters 230 are formed on the substrate 210 and the light blocking member 220 and it is disposed substantially in the open areas defined by the light blocking member 220. The color filters 230 disposed in adjacent two data lines 171 and arranged in the longitudinal direction may be connected to each other to form a stripe. Each color filter 230 may represent one of three primary colors such as red, green and blue colors.

An overcoat 250 preferably made of organic material is formed on the color filters 230 and the light blocking member 220. The overcoat 250 protects the color filters 230 and has a flat top surface.

A common electrode 270 preferably made of transparent conductive material such as ITO and IZO is formed on the overcoat 250. The common electrode 270 is supplied with the common voltage and it has a plurality of sets of a chevron-like regular cutout 271 and a pair of fine cutouts 276 that extend along the regular cutout 271 near the regular cutout 271 and are disposed opposite each other with respect to the regular cutout 271.

Each regular cutout 271 includes a pair of oblique portions connected to each other, a transverse portion connected to one of the oblique portions, and a longitudinal portion connected to the other of the oblique portions. The oblique portions of the regular cutout 271 extend substantially parallel to the oblique portions of the data lines 171 and face a pixel electrode 190 so that they may bisect the pixel electrode 190 into left and right halves. The transverse and the longitudinal portions of the regular cutout 271 are aligned with transverse and longitudinal edges of the pixel electrode 190, respectively, and they make obtuse angles with the oblique portions of the regular cutout 190.

Each fine cutout 276 includes a pair of oblique portions connected to each other and extending along the oblique portions of the regular cutout 271. One of the fine cutouts 276 are connected to the longitudinal portion of the regular cutout 271.

The regular cutouts 271 are provided for controlling the tilt directions of the LC molecules 310 in the LC layer 300 and preferably have a width in a range of about 8-13 microns. The fine cutouts 276 enhance the control of the molecular tilt directions and preferably have a width in a range of about 2-5 microns. It is preferable that the distance between the regular cutout 271 and the fine cutouts 276 adjacent thereto ranges about 2-5 microns.

The cutouts 271 may be substituted with protrusions preferably made of organic material and preferably having width ranging about 5 microns to 10 microns.

A homogeneous or homeotropic alignment layer 21 is coated on the common electrode 270.

A pair of polarizers 12 and 22 are provided on outer surfaces of the panels 100 and 200 such that their transmissive axes are crossed and one of the transmissive axes is parallel to the gate lines 121.

The LCD may further include at least one retardation film for compensating the retardation of the LC layer 300 and a backlight unit for providing light for the LCD.

The LC layer 300 has negative dielectric anisotropy and the LC molecules 310 in the LC layer 300 are aligned such that their long axes are vertical to the surfaces of the panels 100 and 200 in absence of electric field. The alignment of the LC molecules 310 are mainly determined by the aligning force of the alignment layers 11 and 21, but it may not.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the regular cutouts 271 of the common electrode 270 and the edges of the pixel electrodes 190 distort the primary electric field to have a horizontal component which determines the tilt directions of the LC molecules 310. The horizontal component of the primary electric field is perpendicular to the edges of the regular cutouts 271 and the edges of the pixel electrodes 190.

In the meantime, the fine cutouts 276 enhance the horizontal component of the primary electric field near the regular cutouts 271 to reach the LC molecules 310 far from the regular cutouts 271, in particular, to reach the LC molecules 310 equidistant from the regular cutouts 271 and the edges of the pixel electrode 190 adjacent thereto. Accordingly, the LC molecules 310 far from the regular cutouts 271 and the edges of the pixel electrodes 190 as well as those close to the regular cutouts 271 and the edges of the pixel electrodes 190 show short response time, thereby increasing the luminance thereof.

Accordingly, four sub-regions having different tilt directions, which are partitioned by edges of a pixel electrode 190, a regular cutout 271 bisecting the pixel electrode 190, and an imaginary transverse center line passing through the meeting point of the oblique portions of the regular cutout 271, are formed in a pixel region of the LC layer 300, which are located on the pixel electrode 190. Each sub-region has two major edges defined by the regular cutout 271 and an oblique edge of the pixel electrode 190, respectively, which are spaced apart preferably from about 10 microns to about 30 microns. The number of the sub-regions in a pixel region is preferably four if the planar area of the pixel region is smaller than about 100×300 square microns, and, if not, it is preferably four or eight. The number of the sub-regions can be varied by changing the number of the regular cutouts 271 of the common electrode 270, by providing cutouts at the pixel electrodes 190, or by changing the number of curved points of the edges of the pixel electrodes 190. The sub-regions are classified into a plurality of, preferably four, domains based on the tilt directions. The number of the fine cutouts 276 as well as the regular cutouts 271 may be varied may be varied depending on the design factors.

In the meantime, the direction of a secondary electric field due to the voltage difference between the pixel electrodes 190 is perpendicular to the edges of the regular cutouts 271. Accordingly, the field direction of the secondary electric field coincides with that of the horizontal component of the primary electric field. Consequently, the secondary electric field between the pixel electrodes 190 enhances the determination of the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The resistance increase of the data lines 171 due to the curving can be compensated by widening the data lines 171 since distortion of the electric field and increase of the parasitic capacitance due to the increase of the width of the data lines 171 can be compensated by maximizing the size of the pixel electrodes 190 and by adapting a thick organic passivation layer.

A method of manufacturing the TFT array panel shown in FIGS. 1-5 according to an embodiment of the present invention will be now described in detail with reference to FIGS. 6A, 6B, 7A and 7B as well as FIGS. 1-5.

Figure 6A:
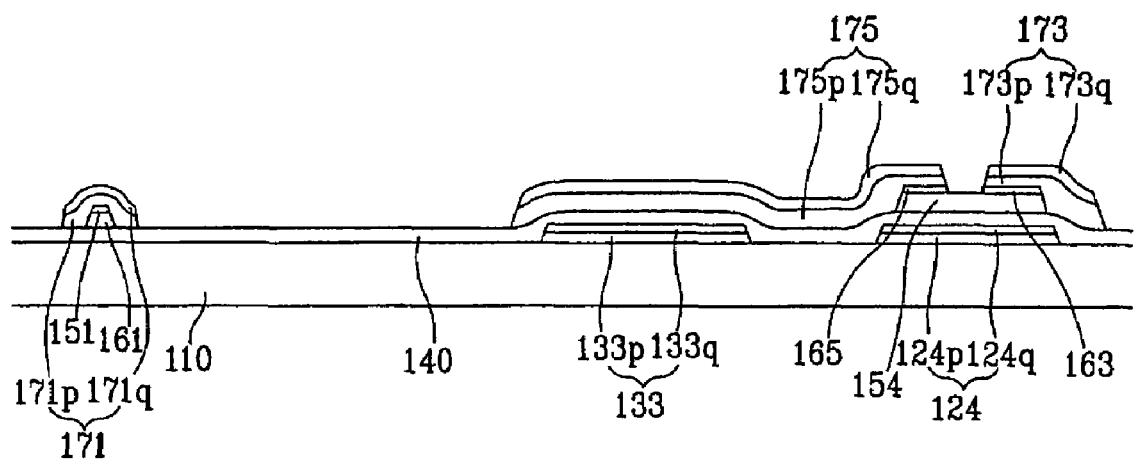
FIGS. 6A and 6B are sectional views of the TFT array panel shown in FIGS. 1, 4 and 5 taken along the line IV-IV' and the lines V-V' and V'-V''', respectively, in an intermediate step of a manufacturing method thereof according to an embodiment of the present invention.
Figure 6B:
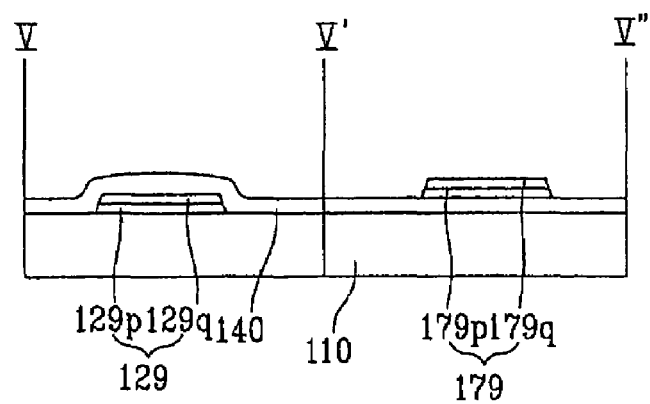
Figure 7A:
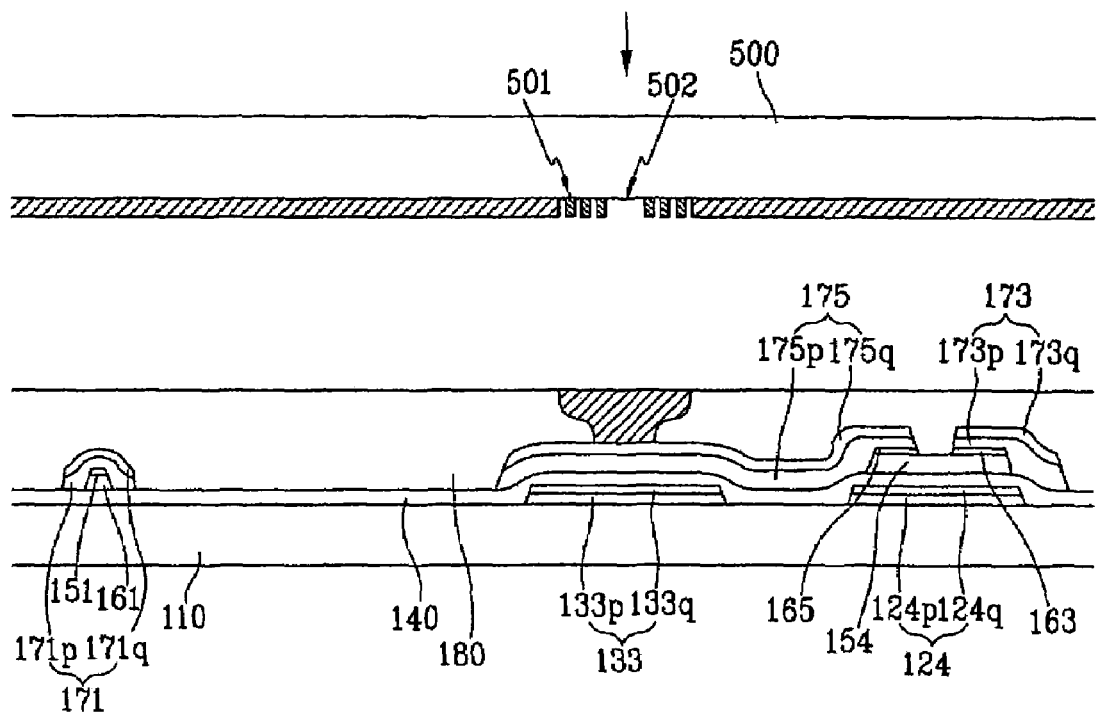
FIGS. 7A and 7B are sectional views of the TFT array panel shown in FIGS. 1, 4 and 5 taken along the line IV-IV' and the lines V-V' and V'-V''', respectively, in the step of the manufacturing method following the step shown in FIGS. 6A and 6B.
Figure 7B:
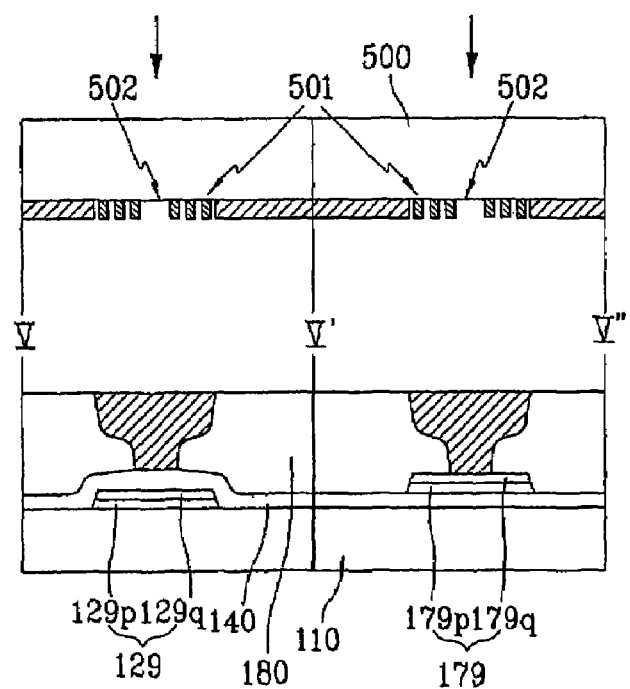

FIGS. 6A and 6B are sectional views of the TFT array panel shown in FIGS. 1, 4 and 5 taken along the line IV-IV' and the lines V-V' and V'-V'', respectively, in an intermediate step of a manufacturing method thereof according to an embodiment of the present invention, and FIGS. 7A and 7B are sectional views of the TFT array panel shown in FIGS. 1, 4 and 5 taken along the line IV-IV' and the lines V-V' and V'-V'', respectively, in the step of the manufacturing method following the step shown in FIGS. 6A and 6B.

Referring to FIGS. 1, 6A and 6B, a lower conductive film preferably made of Cr, Mo, or Mo alloy and an upper conductive film preferably made of Al containing metal or Ag containing metal are sputtered in sequence on an insulating substrate 110 and they are wet or dry etched in sequence to form a plurality of gate lines 121, each including a plurality of gate electrodes 124 and an expansion 129, and a plurality of storage electrode lines 131 including a plurality of storage electrodes 133. In FIGS. 6A and 6B, the lower and the upper films of the gate electrodes 124 are indicated by reference numerals 124$p$ and 124$q$, respectively, the lower and the upper films of the expansions 129 are indicated by reference numerals 129$p$ and 129$q$, respectively, and the lower and the upper films of the storage electrodes 133 are indicated by reference numerals 133$p$ and 133$q$, respectively.

After sequential deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor stripes and a plurality of intrinsic semiconductor stripes 151 including a plurality of projections 154 on the gate insulating layer 140.

Subsequently, two conductive films including a lower conductive film and an upper conductive film and having a thickness of 1,500-3,000 Å are sputtered in sequence and patterned to form a plurality of date lines 171, each including a plurality of source electrodes 173 and an expansion 179, and a plurality of drain electrodes 175. The lower conductive film is preferably made of Cr, Mo, or Mo alloy, and the upper conductive film is preferably made of Al containing metal or Ag containing metal. In FIGS. 6A and 6B, the lower and the upper films of the drain electrodes 171 are indicated by reference numerals 171$p$ and 171$q$, respectively, the lower and the upper films of the source electrodes 173 are indicated by reference numerals 173$p$ and 173$q$, respectively, the lower and the upper films of the drain electrodes 175 are indicated by reference numerals 175$p$ and 175$q$, respectively, and the lower and the upper films of the end portions 179 of the data lines 171 are indicated by reference numerals 179$p$ and 179$q$, respectively.

Thereafter, portions of the extrinsic semiconductor stripes, which are not covered with the data lines 171 and the drain electrodes 175, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Referring to FIGS. 1, 7A and 7B, a passivation layer 180 made of a photosensitive organic insulator is coated and exposed through a photo-mask 500 having a plurality of transmissive areas 502 and a plurality of slit areas 501 disposed around the transmissive areas 502. Accordingly, portions of the passivation layer 180 facing the transmissive areas 502 absorb the full energy of the light, while portions of the passivation layer 180 facing the slit areas 501 partially absorb the light energy. The passivation layer 180 is then developed to form a plurality of contact holes 182$b$ and 185$b$ exposing portions of the expansions 179 of the data lines 171 and portions of the drain electrodes 175, respectively, and to form upper portions of a plurality of contact holes 181$b$ exposing portions of the gate insulating layer 140 disposed on the expansions 129 of the gate lines 121. Since the portions of the passivation layer 180 facing the transmissive areas 502 are removed to its full thickness, while the portions facing the slit areas 501 remain to have reduced thickness, sidewalls 181$a$, 182$a$ and 185$a$ of the contact holes 181$b$, 182$b$ and 185$b$ have stepped profiles.

After removing the exposed portions of the gate insulating layer 140 to expose the underlying portions of the expansions 129 of the gate lines 121, the exposed portions of the upper conductive films 175$q$, 179$q$ and 129$q$ of the drain electrodes 175, the expansions 179 of the data lines 171, and the expansions 129 of the gate lines 121 are removed to expose underlying portions of the lower conductive films 175$p$, 179$p$ and 129$p$ of the drain electrodes 175, the expansions 179 of the data lines 171, and the expansions 129 of the gate lines 121.

A plurality of pixel electrodes 190 and a plurality of contact assistants 81 and 82 are formed on the passivation layer 180 and on the exposed portions of the lower conductive films 175$p$, 179$p$ and 129$p$ of the drain electrodes 175, the expansions 129 of the gate lines 121, and the expansions 179 of the data lines 171 by sputtering and photo-etching an IZO or ITO layer with thickness of about 400-500 Å.

Finally, an alignment layer 11 is coated as shown in FIGS. 1, 4 and 5.

An LCD according to another embodiment of the present invention will be described in detail with reference to FIGS. 8-11.

Figure 8:
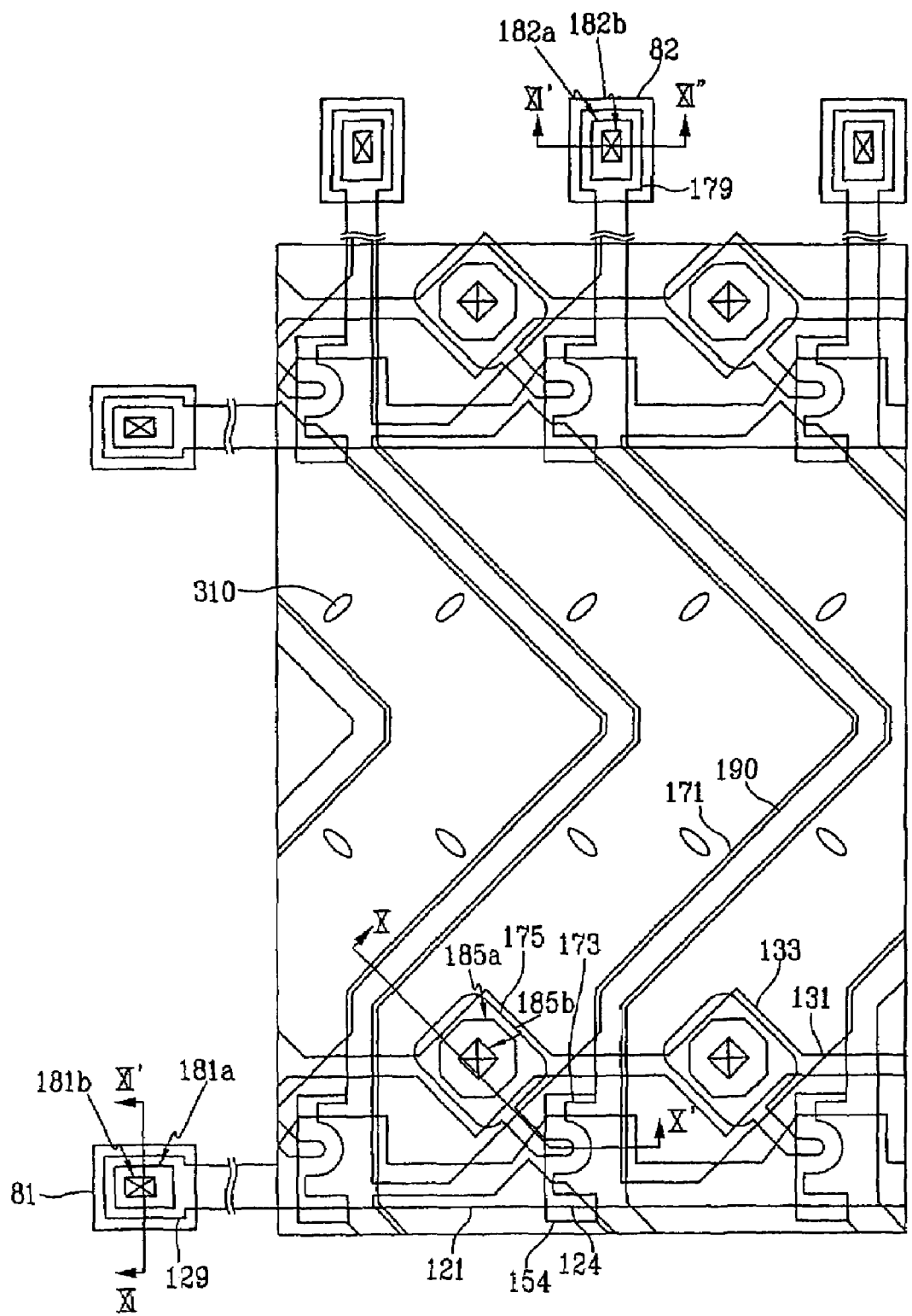
FIG. 8 is a layout view of a TFT array panel according to another embodiment of the present invention.
Figure 9:
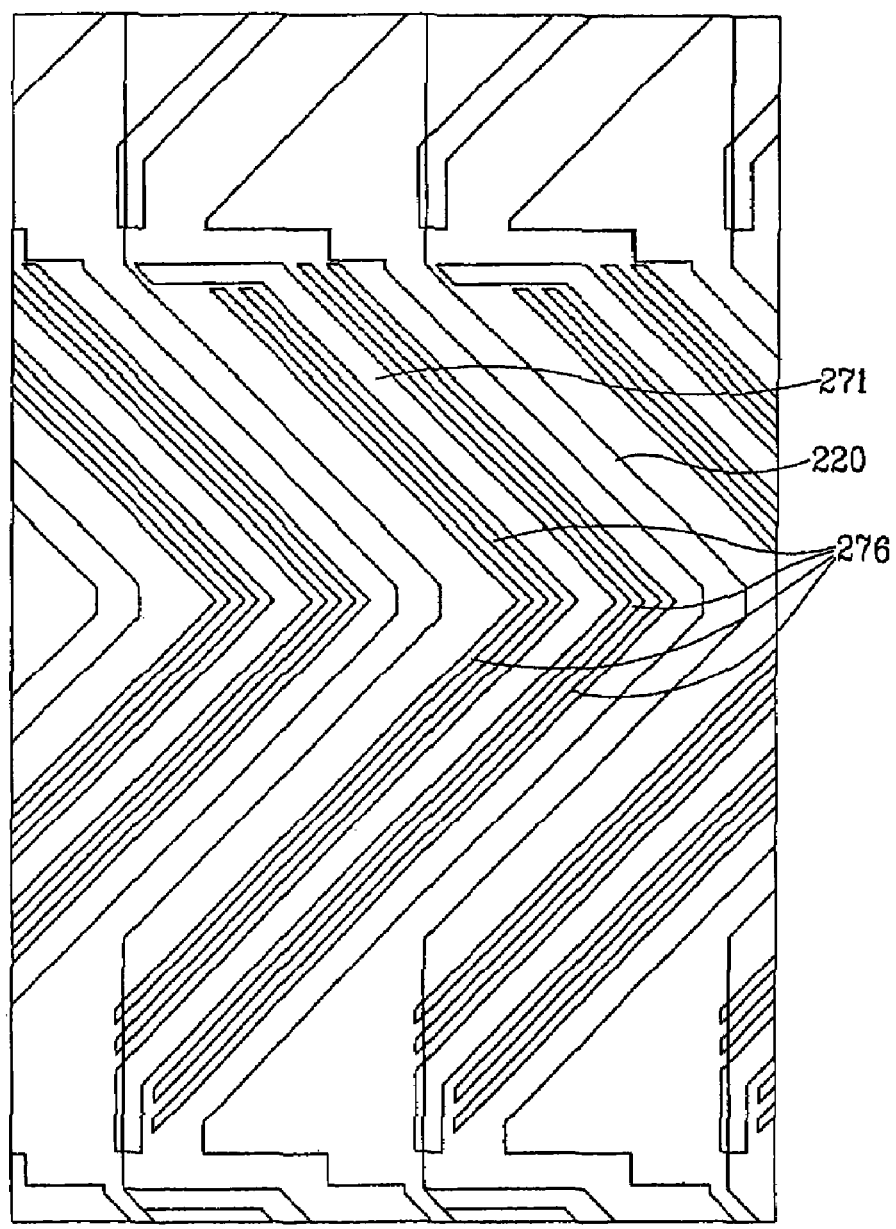
FIG. 9 is a layout view of a common electrode panel according to another embodiment of the present invention.
Figure 10:
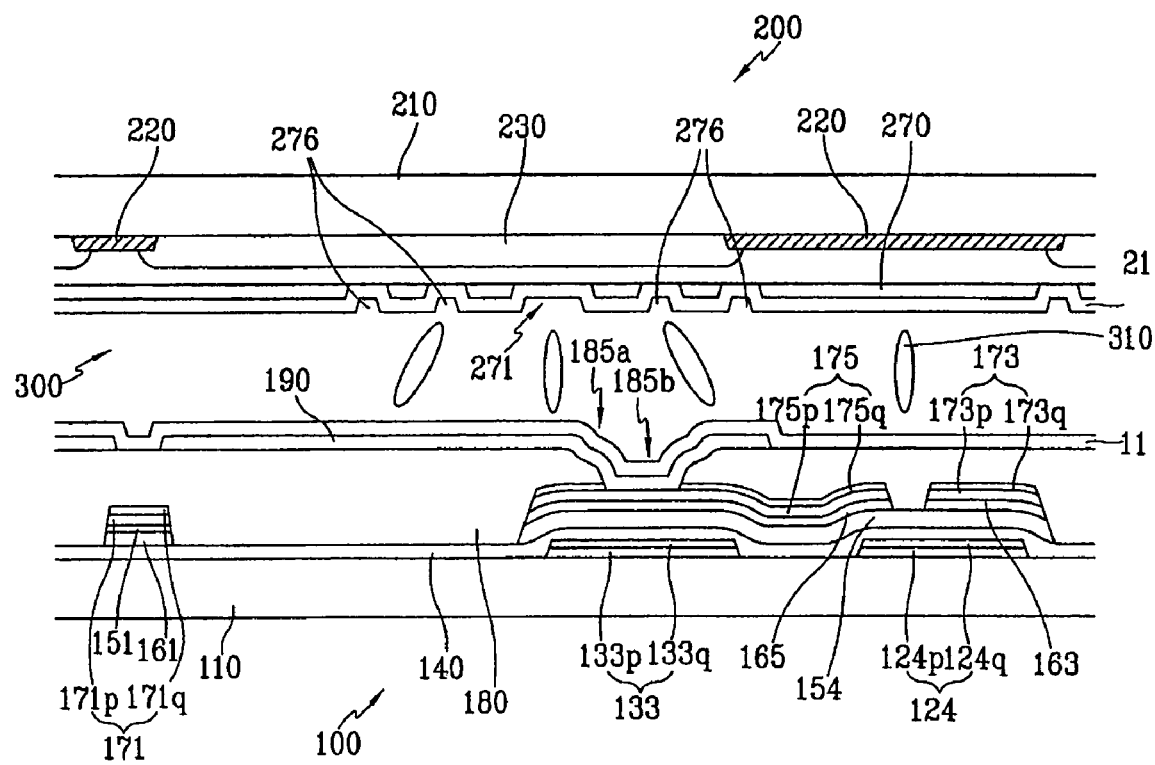
FIG. 10 is a sectional view of an LCD including the TFT array panel shown in FIG. 8 and the common electrode panel shown in FIG. 9 taken along the line X-X' in FIG. 8.
Figure 11:
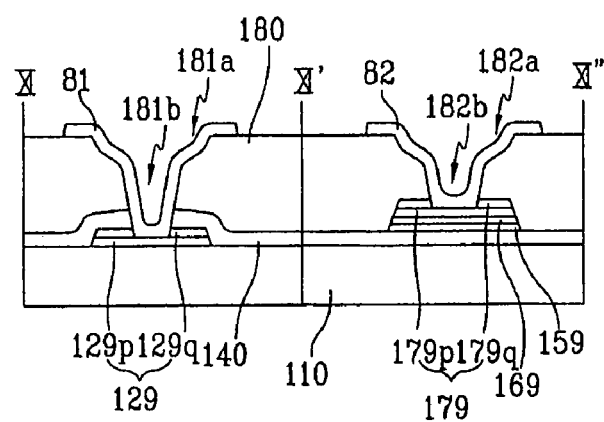
FIG. 11 is a sectional view of the LCD including the TFT array panel shown in FIG. 8 and the common electrode panel shown in FIG. 9 taken along the lines XI-XI' and XI'-XI'' in FIG. 8.

FIG. 8 is a layout view of a TFT array panel according to another embodiment of the present invention, FIG. 9 is a layout view of a common electrode panel according to another embodiment of the present invention, FIG. 10 is a sectional view of an LCD including the TFT array panel shown in FIG. 8 and the common electrode panel shown in FIG. 9 taken along the line X-X' in FIG. 8, and FIG. 11 is a sectional view of the LCD shown in FIGS. 8 and 9 taken along the lines XI-XI' and XI'-XI'' in FIG. 8.

Referring to FIGS. 8-11, an LCD according to this embodiment also includes a TFT array panel 100, a common electrode panel 200, and a LC layer 300 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 185b are provided at the passivation layer 180 and the gate insulating layer 140. A plurality of pixel electrodes 190 and a plurality of contact assistants 81 and 82 are formed on the passivation layer 180 and an alignment layer 11 is coated thereon.

Regarding the common electrode panel 200, a light blocking member 220, a plurality of color filters 230, an overcoat 250, a common electrode 270 having a plurality of regular cutouts 271 and fine cutouts 276, and an alignment layer 21 are formed on an insulating substrate 210.

Different from the LCD shown in FIGS. 1-5, two pairs of fine cutouts 276 are disposed around a regular cutout 271.

In addition, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 1-5 may be appropriate to the LCD shown in FIGS. 8-11.

Now, a method of manufacturing the TFT array panel shown in FIGS. 8-11 according to an embodiment of the present invention will be described in detail.

Figure 12A:
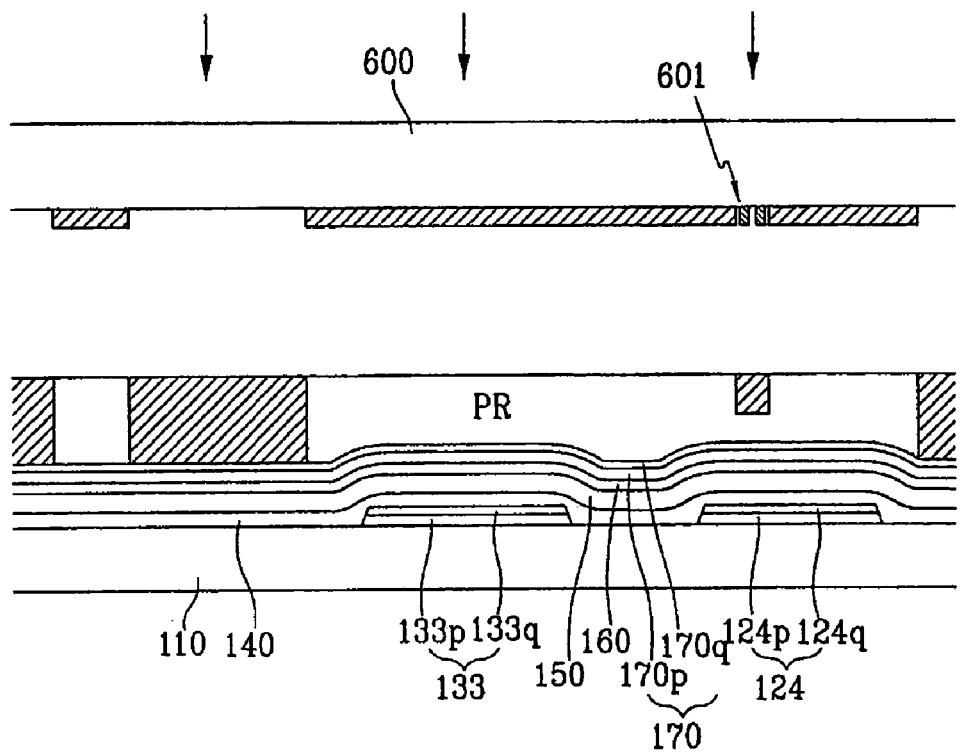
FIGS. 12A and 12B are sectional views of the TFT array panel shown in FIGS. 8, 10 and 11 taken along the line X-X' and the lines XI-XI' and XI'-XI'', respectively, in an intermediate step of a manufacturing method thereof according to an embodiment of the present invention.
Figure 12B:
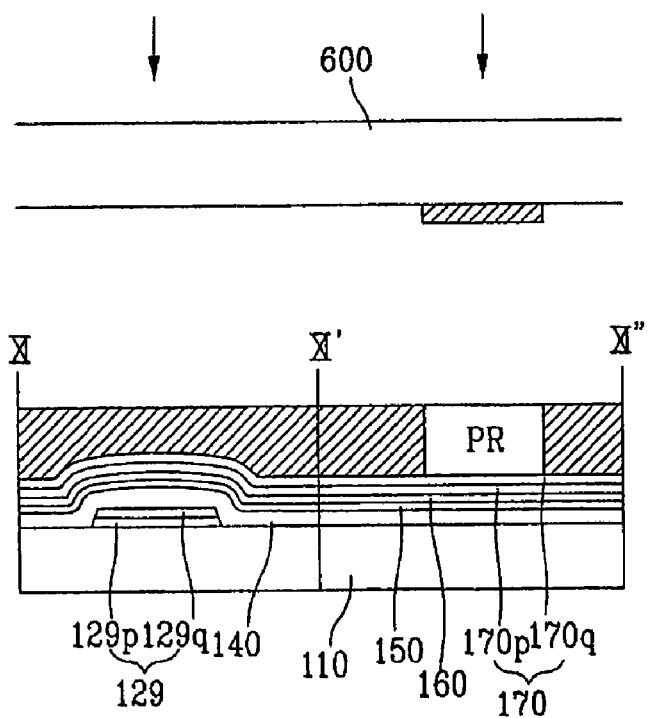
Figure 13A:
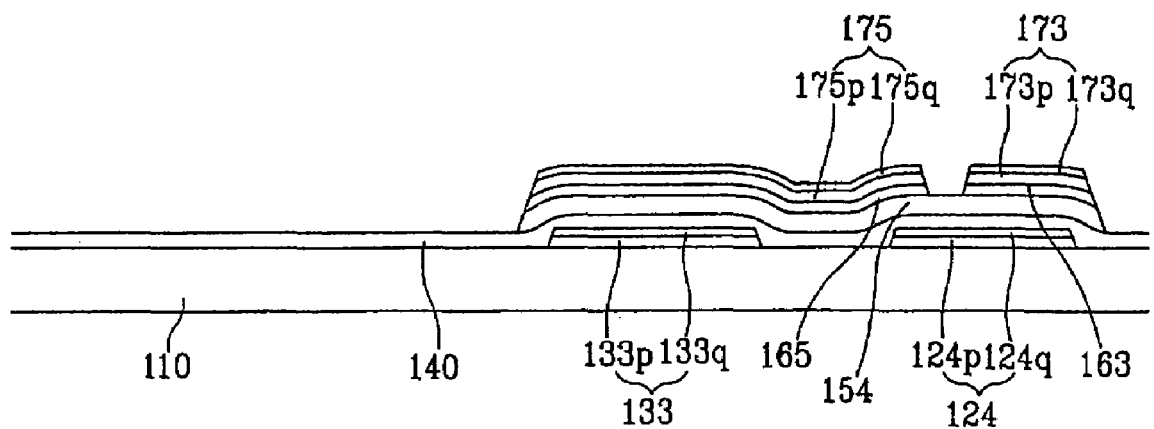
FIGS. 13A and 13B are sectional views of the TFT array panel shown in FIGS. 8, 10 and 11 taken along the line X-X' and the lines XI-XI' and XI'-XI'' in the step of the manufacturing method following the step shown in FIGS. 12A and 12B.
Figure 13B:
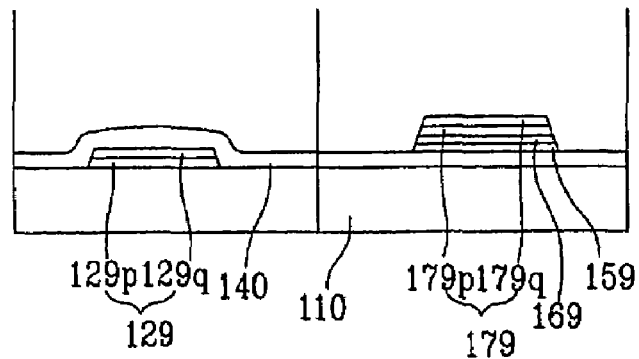

FIGS. 12A and 12B are sectional views of the TFT array panel shown in FIGS. 8, 10 and 11 taken along the line X-X' and the lines XI-XI' and XI'-XI", respectively, in an intermediate step of a manufacturing method thereof according to an embodiment of the present invention; and FIGS. 13A and 13B are sectional views of the TFT array panel shown in FIGS. 8, 10 and 11 taken along the line X-X' and the lines XI-XI' and XI'-XI" in the step of the manufacturing method following the step shown in FIGS. 12A and 12B.

Referring to FIGS. 12A and 12B, two conductive films, a lower conductive film and an upper conductive film are sputtered in sequence on an insulating substrate 110 and they are wet or dry etched in sequence to form a plurality of gate lines 121, each including a plurality of gate electrodes 124 and an expansion 129, and a plurality of storage electrode lines 131 including a plurality of storage electrodes 133. In FIGS. 12A and 12B, the lower and the upper films of the gate electrodes 124 are indicated by reference numerals 124p and 124q, respectively, the lower and the upper films of the expansions 129 are indicated by reference numerals 129p and 129q, respectively, and the lower and the upper films of the storage electrodes 133 are indicated by reference numerals 133p and 133q, respectively.

Next, a gate insulating layer 140, an intrinsic a-Si layer 150, and an extrinsic a-Si layer 160 are sequentially deposited by CVD such that the layers 140, 150 and 160 bear thickness of about 1,500-5,000 Å, about 500-2,000 Å and about 300-600 Å, respectively. A conductive layer 170 including a lower film 170p and an upper film 170q is deposited by sputtering, and a photoresist film PR with the thickness of about 1-2 microns is coated on the conductive layer 170.

The photoresist film PR is exposed to light through an exposure mask 600 including slit areas 601, and developed such that the developed photoresist PR has a position dependent thickness. The photoresist PR shown in FIGS. 12A and 12B includes a plurality of first to third portions with decreased thickness. The first portions are located on first areas (referred to as "wire areas" hereinafter) and the second portions are located on second areas (referred to as "channel areas" hereinafter), respectively, while the third portions located on remaining third areas are not illustrated in the figures since they have substantially zero thickness to expose underlying portions of the conductive layer 170. The hatched portions of the photoresist PR are the portions to be removed after development. The thickness of the second portions is preferably smaller than half of that of the first portions and more preferably, it is smaller than about 4,000 Å.

The different thickness of the photoresist PR enables to selectively etch the underlying layers when using suitable process conditions. Therefore, a plurality of data lines 171 including a plurality of source electrodes 173, and a plurality of drain electrodes 175 as well as a plurality of ohmic contact stripes 161 including a plurality of projections 163, a plurality of ohmic contact islands 165 and a plurality of semiconductor stripes 151 including a plurality of projections 154 are obtained by a series of etching steps as shown in FIGS. 13A and 13B. In FIGS. 13A and 13B, the lower and the upper films of the source electrodes 173 are indicated by reference numerals 173p and 173q, respectively, the lower and the upper films of the drain electrodes 175 are indicated by reference numerals 175p and 175q, respectively, and the lower and the upper films of the end portions 179 of the data lines 171 are indicated by reference numerals 179p and 179q, respectively.

For descriptive purpose, portions of the conductive layer 170, the extrinsic a-Si layer 160, and the intrinsic a-Si layer 150 on the wire areas are called first portions, portions of the conductive layer 170, the extrinsic a-Si layer 160, and the intrinsic a-Si layer 150 on the channel areas are called second portions, and portions of the conductive layer 170, the extrinsic a-Si layer 160, and the intrinsic a-Si layer 150 on the third areas are called third portions.

An exemplary sequence of forming such a structure is as follows:

(1) Removal of third portions of the conductive layer 170, the extrinsic a-Si layer 160 and the intrinsic a-Si layer 150 on the third areas;

(2) Removal of the second portions of the photoresist PR;

(3) Removal of the second portions of the conductive layer 170 and the extrinsic a-Si layer 160 on the channel areas; and (4) Removal of the first portions of the photoresist PR.

Another exemplary sequence is as follows:

(1) Removal of the third portions of the conductive layer 170;

(2) Removal of the second portions of the photoresist PR;

(3) Removal of the third portions of the extrinsic a-Si layer 160 and the intrinsic a-Si layer 150;

(4) Removal of the second portions of the conductive layer 170;

(5) Removal of the first portions of the photoresist PR; and (6) Removal of the second portions of the extrinsic a-Si layer 160.

The first example is described in detail.

At first, the exposed third portions of the conductive layer 170 on the third areas are removed by wet etch or dry etch to expose the underlying third portions of the extrinsic a-Si layer 160. An Al containing metal film is preferably wet etched, while a Mo containing metal film can be etched by both wet etch and dry etch. The lower and the upper films 170p and 170q may be etched under a single etch condition. The dry etching may etch out the top portions of the photoresist PR.

Next, the third portions of the extrinsic a-Si layer 160 on the third areas and of the intrinsic a-Si layer 150 are removed preferably by dry etching and the second portions of the photoresist PR are removed to expose the second portions of the conductors 170. The removal of the second portions of the photoresist PR are performed either simultaneously with or independent from the removal of the third portions of the extrinsic a-Si layer 160 and of the intrinsic a-Si layer 150. Residue of the second portions of the photoresist PR remained on the channel areas is removed by ashing.

The semiconductor stripes 151 are completed in this step.

The lower film 170q of the conductive layer 170, the extrinsic a-Si layer 160, and the intrinsic a-Si layer 150 may be dry-etched in sequence to simplify the manufacturing process. In this case, the dry etching of the three film and layers 701, 160 and 150 may be performed in-situ in a single etching chamber.

Next, the second portions of the conductors 170 and the extrinsic a-Si layer 160 on the channel areas as well as the first portion of the photoresist PR are removed. Top portions of the projections 154 of the intrinsic semiconductor stripes 151 on the channel areas may be removed to cause thickness reduction, and the first portions of the photoresist may be etched to a predetermined thickness.

In this way, each conductor 170 is divided into a data line 171 and a plurality of drain electrodes 175 to be completed, and the extrinsic a-Si layer 160 is divided into an ohmic contact stripe 161 and a plurality of ohmic contact islands 165 to be completed.

Subsequently, a passivation layer 180, a plurality of pixel electrodes 190, a plurality of contact assistants 81 and 82, and an alignment layer 11 are formed in sequence as described with reference to FIGS. 7A and 7B.

Since the manufacturing method of the TFT array panel according to an embodiment simultaneously forms the data lines 171, the drain electrodes 175, the semiconductors 151, and the ohmic contacts 161 and 165 using one photolithography process, the manufacturing process is simplified by omitting a photolithography step.

An LCD according to another embodiment of the present invention will be described in detail with reference to FIGS. 14-16.

Figure 14:
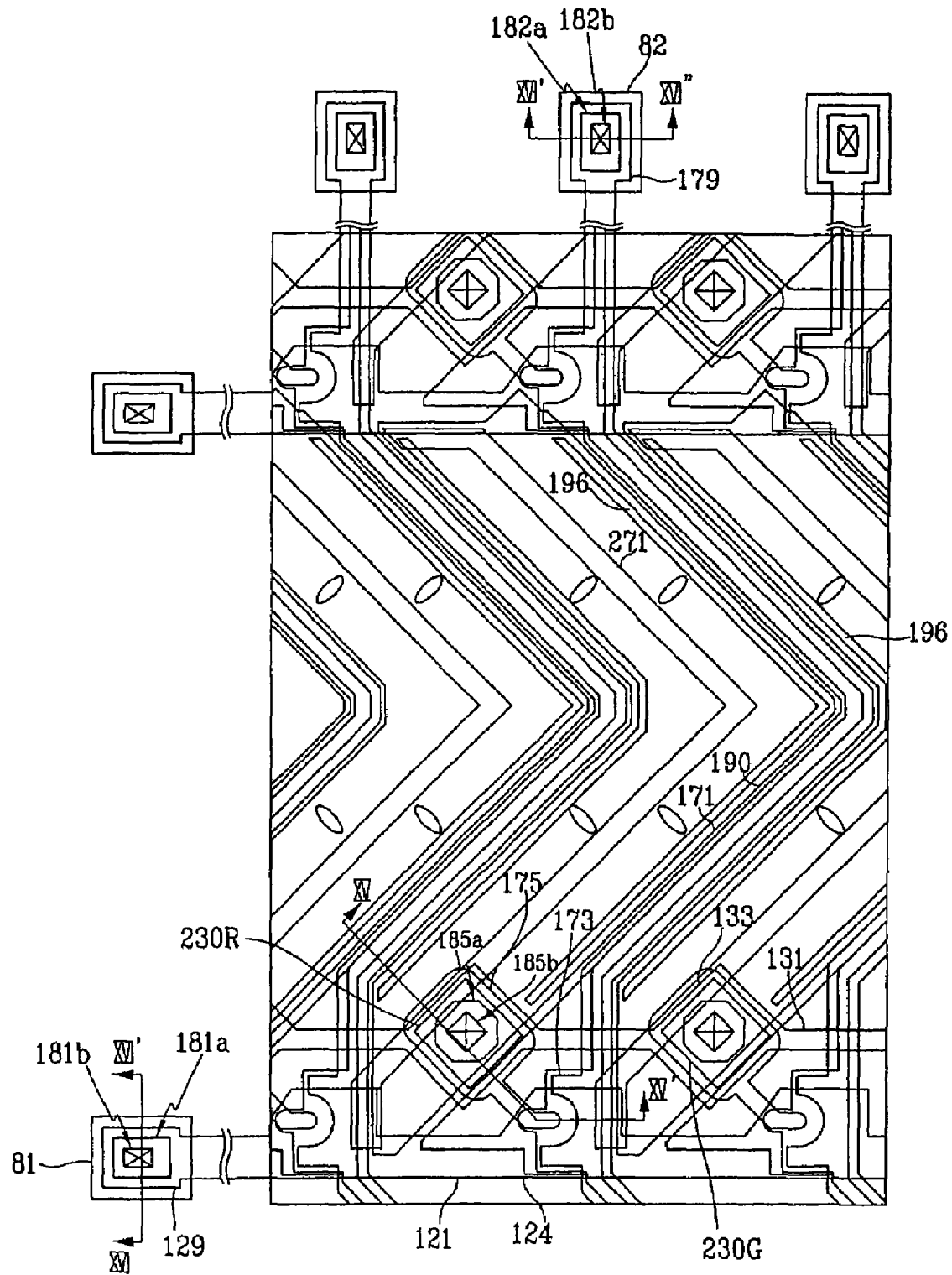
FIG. 14 is a layout view of an LCD according to another embodiment of the present invention.
Figure 15:
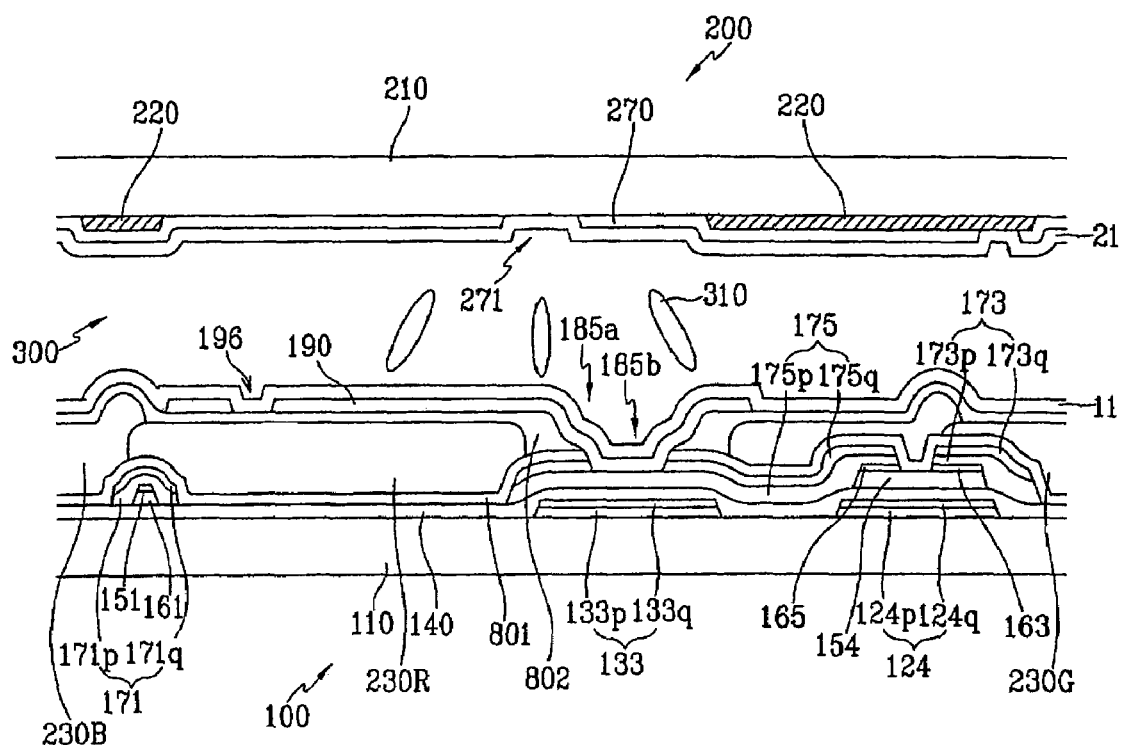
FIG. 15 is a sectional view of the LCD shown in FIG. 14 taken along the line XV-XV'.
Figure 16:
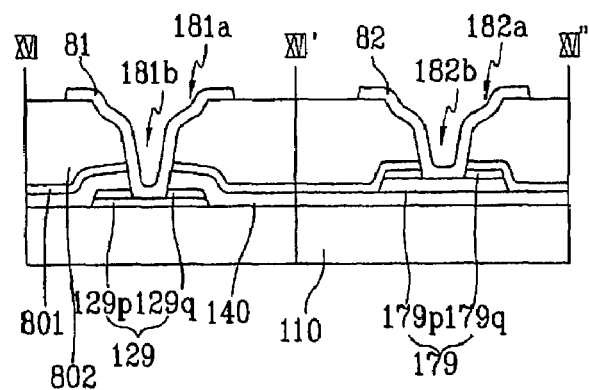
FIG. 16 is a sectional view of the LCD shown in FIG. 14 taken along the lines XVI-XVI' and XVI'-XVI''.

FIG. 14 is a layout view of an LCD according to another embodiment of the present invention, FIG. 15 is a sectional view of the LCD shown in FIG. 14 taken along the line XV-XV', and FIG. 16 is a sectional view of the LCD shown in FIG. 14 taken along the lines XVI-XVI' and XVI'-XVI".

Referring to FIGS. 14-16, an LCD according to this embodiment also includes a TFT array panel 100, a common electrode panel 200, and a LC layer 300 interposed therebetween.

Regarding a TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140.

A first passivation layer 801 preferably made of inorganic insulator such as SiNx is formed on the data lines 171 and the drain electrodes 175.

A plurality of red, green and blue color filters 230R, 230G and 230B is formed on the first passivation layer 801 and they are disposed substantially between the data lines 171. The color filters 230R, 230G or 230B in adjacent two data lines 171 and arranged in the longitudinal direction may be connected to each other to form a periodically-curved stripe. The neighboring color filters 230R, 230G and 230B overlap each other on the data lines 171 to form hills. The color filters 230R, 230G and 230B have a plurality of openings disposed on the drain electrodes 175 and are not provided on a peripheral area which is provided with the expansions 129 and 179 of the gate lines 121 and the data lines 179.

A second passivation layer 802 preferably made of photosensitive organic material is formed on the color filters 230R, 230G and 230B. The second passivation layer 802 also forms hills when running over the hills formed by the color filters 230R, 230G and 230B and the hills of the second passivation layer 802 may cause an inclined surface of the alignment layer 11 to enhance the control of the tilt directions of LC molecules 310 in the LC layer 300. The second passivation layer 802 prevents the color filters 230R, 230G and 230B from being exposed to contaminate the LC layer 300 and it may be made of inorganic insulator such as SiNx and SiO2.

One of the first and the second passivation layers 801 and 802 may be omitted, and in particular, the second passivation layer 802 can be omitted when the color filters 230R, 230G and 230B do not emit impurities such as color agents.

The passivation layers 801 and 802 have a plurality of contact holes 182b and 185b, and the passivation layers 801 and 802 and the gate insulating layer 140 have a plurality of contact holes 181b. The openings of the color filters 230R, 230G and 230B expose the contact holes 185b and a top surface of the first passivation layer 801.

A plurality of pixel electrodes 190 and a plurality of contact assistants 81 and 82 are formed on the second passivation layer 802.

Each pixel electrode 190 has a pair of fine cutouts 196 disposed near left and right edges, respectively. Each fine cutout 196 includes a pair of oblique portions connected to each other and extends along the curved edges. The fine cutouts 196 enhance a horizontal component of an electric field near the edges of the pixel electrodes 190 to reach the LC molecules 310 far from the edges, in particular, to reach the LC molecules 310 equidistant from the regular cutouts 271 and the edges of the pixel electrode 190 adjacent thereto. Accordingly, the LC molecules 310 far from the edges of the pixel electrodes 190 as well as those close to the edges show short response time, thereby increasing the luminance thereof.

The common electrode panel 200 includes a light blocking member 220 and a common electrode 270 having a plurality of regular cutouts 271, which are formed on an insulating substrate 210. Comparing the common electrode panel 200 shown in FIGS. 2, 4 and 5, the common electrode panel 200 shown in FIGS. 14-16 has no color filter and no overcoat.

Since the color filters 230R, 230G and 230B and the pixel electrodes 190 are provided on the TFT array panel 100, the LCD shown in FIGS. 14-16 may have a large alignment margin for aligning the TFT array panel 100 and the common electrode panel 200.

A TFT array panel 100 shown in FIGS. 14-16 may be manufactured by depositing a first passivation layer 801, forming a plurality of red, green, and blue color filters 230R, 230G, and 230B, coating a second passivation layer 802 made of a photosensitive organic layer, exposing and developing the passivation layer 802 to form upper portions of a plurality of contact holes 181b, 182b and 185b, removing exposed portions of the first passivation layer 801 and the gate insulating layer 140 to form lower portions of the contact holes 181b, 182b and 185b, and forming a plurality of pixel electrodes 190 and a plurality of contact assistants 81 and 82, after forming the gate lines 121, the storage electrode lines 131, the gate insulating layer 140, the semiconductor stripes 151, the ohmic contacts 161 and 165, the data lines 171, and the drain electrodes 175 as described above with reference to FIGS. 6A-7B. The formation of the color filters 230R, 230G, and 230B includes thrice repetitions of coating, exposing, and developing a photosensitive film including a colored pigment.

Many of the above-described features of the LCD shown in FIGS. 1-5 may be appropriate to the LCD shown in FIGS. 14-16.

An LCD according to another embodiment of the present invention will be described in detail with reference to FIGS. 17-20.

Figure 17:
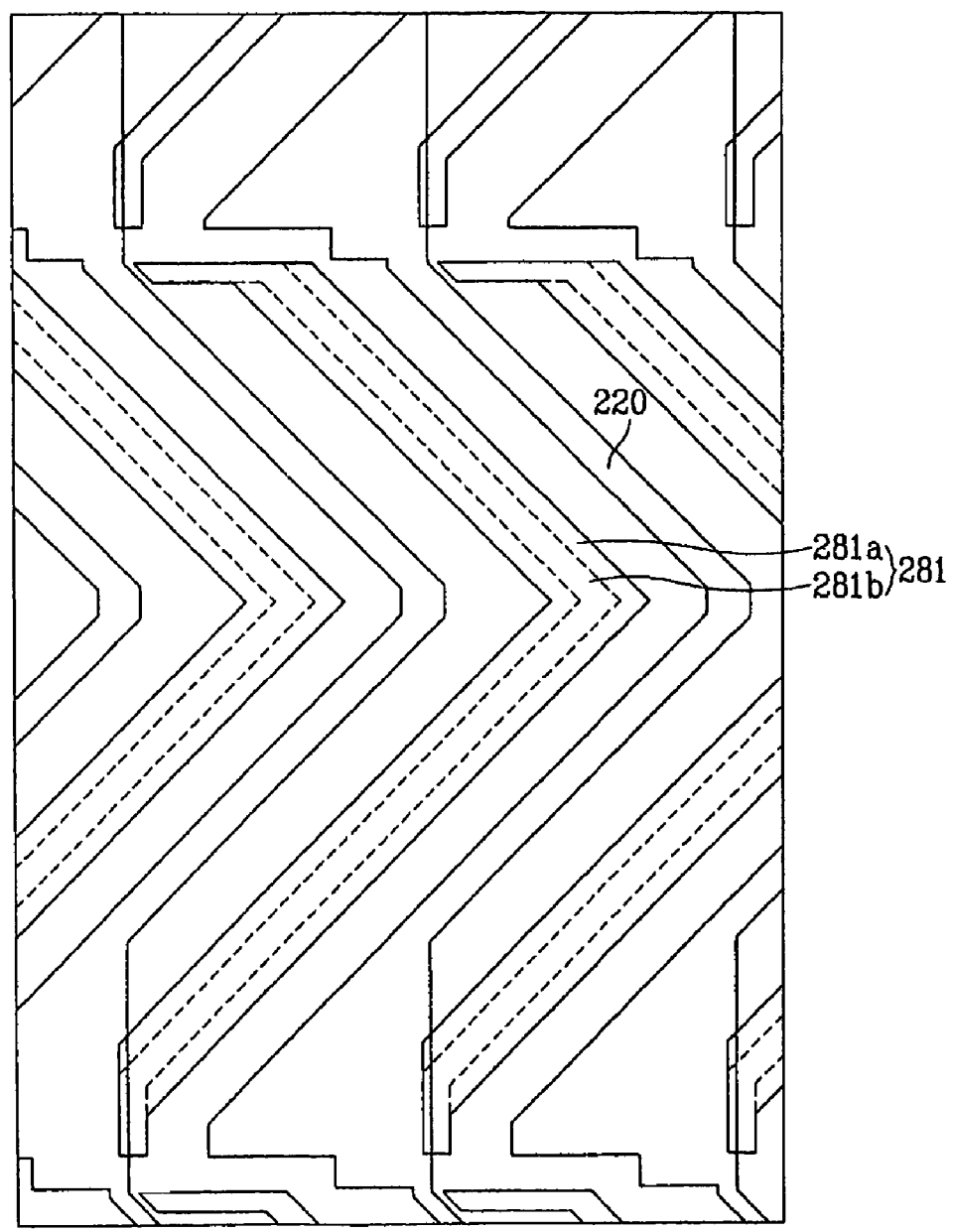
FIG. 17 is a layout view of a common electrode panel according to another embodiment of the present invention.
Figure 18:
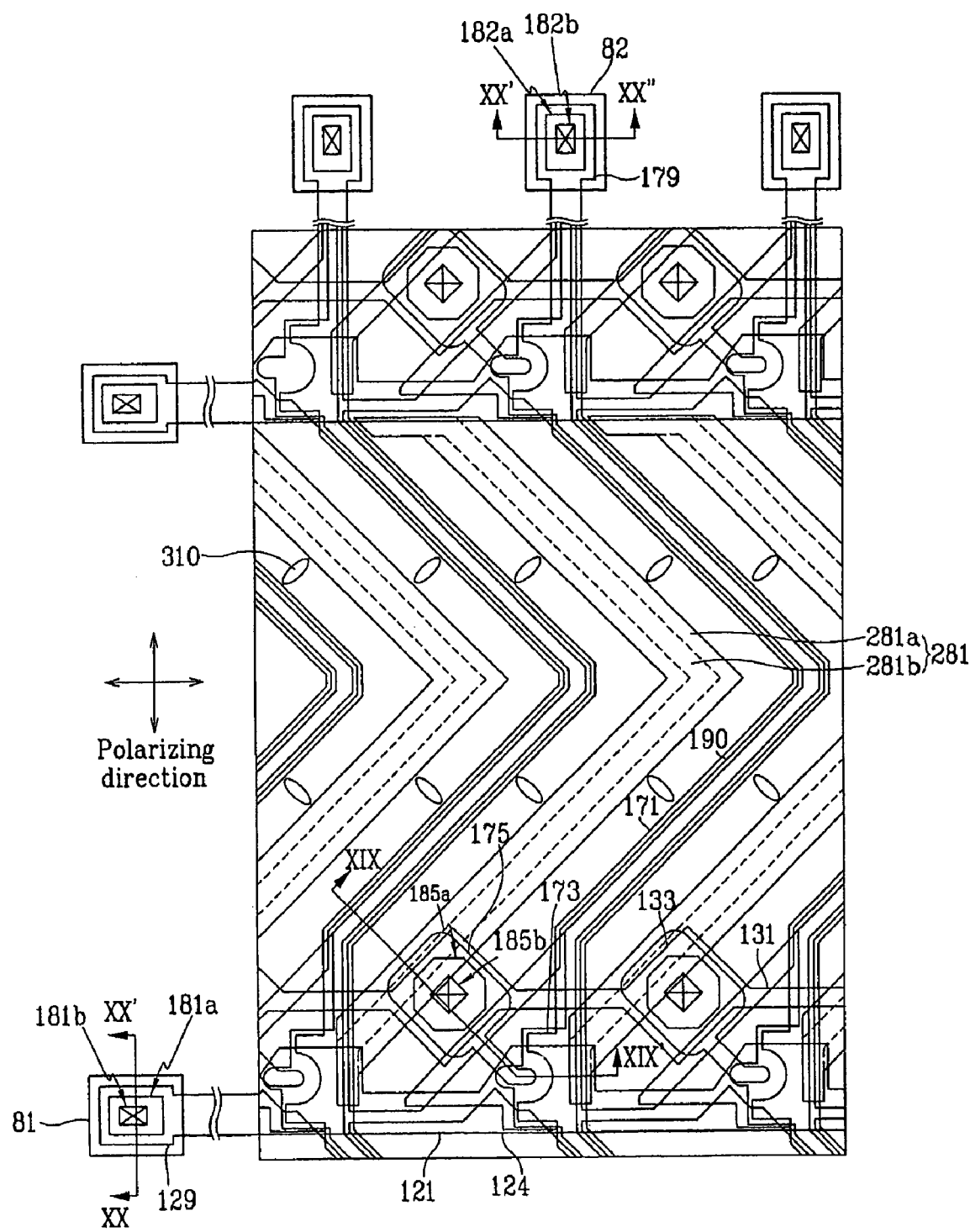
FIG. 18 is a layout view of an LCD including the common electrode panel shown in FIG. 17.
Figure 19:
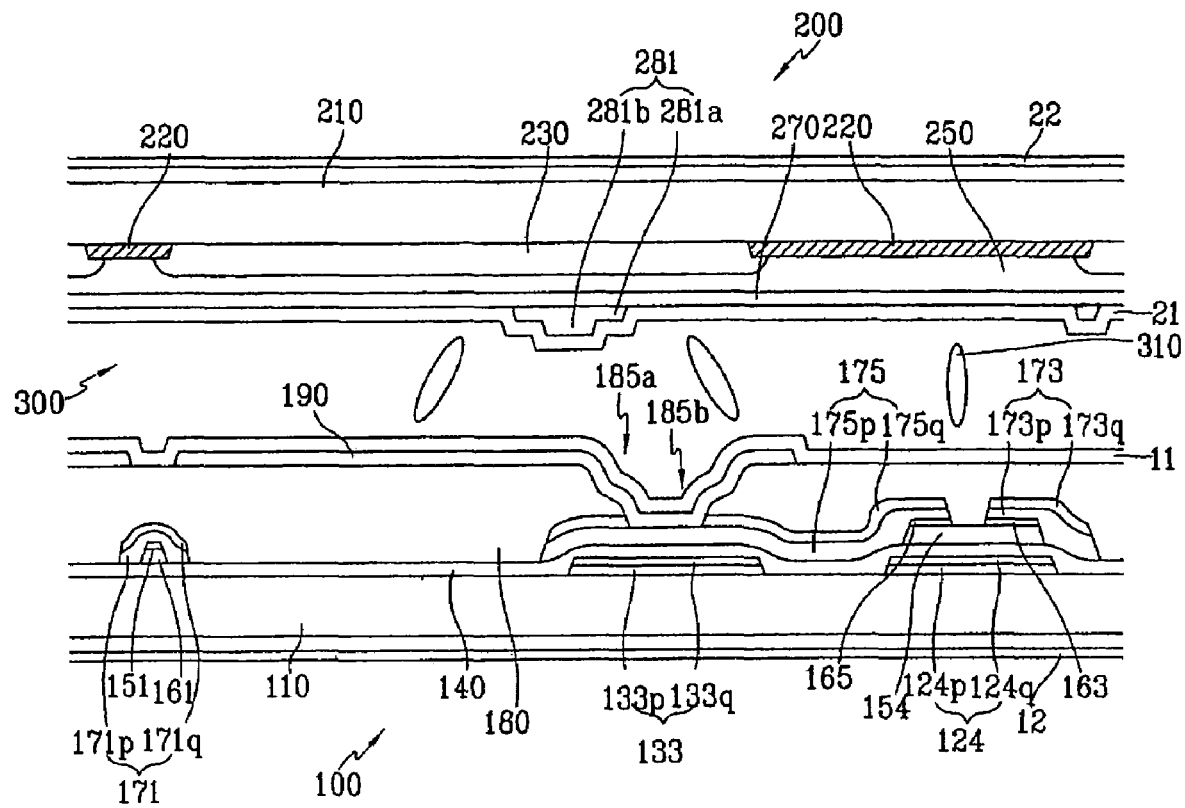
FIGS. 19 and 20 are sectional views of the LCD shown in FIG. 18 taken along the lines XIX-XIX' and XX-XX', respectively.
Figure 20:
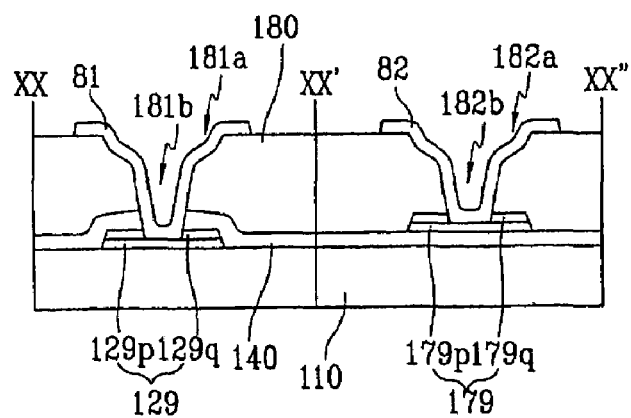

FIG. 17 is a layout view of a common electrode panel according to another embodiment of the present invention, FIG. 18 is a layout view of an LCD including the common electrode panel shown in FIG. 17, and FIGS. 19 and 20 are sectional views of the LCD shown in FIG. 18 taken along the lines XIX-XIX' and XX-XX', respectively.

Referring to FIGS. 17-20, an LCD according to this embodiment also includes a TFT array panel 100, a common electrode panel 200, and a LC layer 300 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 185b are provided at the passivation layer 180 and the gate insulating layer 140. A plurality of pixel electrodes 190 and a plurality of contact assistants 81 and 82 are formed on the passivation layer 180 and an alignment layer 11 is coated thereon.

Regarding the common electrode panel 200, a light blocking member 220, a plurality of color filters 230, an overcoat 250, a common electrode 270, and an alignment layer 21 are formed on an insulating substrate 210.

Different from the LCD shown in FIGS. 1-5, the cutouts 271 and 276 shown in FIGS. 1-5 are substituted with a plurality of protrusions 281 provided on the common electrode 270, which are preferably made of photosensitive organic insulator. Each protrusion 281 includes a higher center portion 281a and a pair of lower side portions 281b disposed opposite each other with respect to the center portion 281a such that the protrusion 281 has a shape of a step. It is preferable that the width of the protrusions 281 and the higher portion 281a range about 10-40 microns and about 5-10 microns, respectively, and the height of the higher portion 281a and the lower portions 281b range about 1.0-2.0 microns and about 0.3-1.3 microns, respectively. The higher and the lower portions 281a and 281b of the protrusions 281 may be made of different films with two photolithography steps or made of a single film with one photolithography step with a slit mask (not shown).

Like the regular cutouts 271 shown in FIGS. 1-5, the protrusions 281 control the tilt directions of the LC molecules 310 in the LC layer 300, and the lower portions 281b enhance the control of the molecular tilt directions like the fine cutouts 276 shown in FIGS. 1-5. In detail, the LC molecules 310 are pretilted perpendicular to inclined surfaces of the alignment layer 21 on the protrusions 281, and thus they are tilted along the pretilt directions upon the application of an electric field. In addition, the lower portions 281b enhance the aligning force of the alignment layer 21 near the protrusions 281 to reach the LC molecules 310 far from the protrusions 281, in particular, to reach the LC molecules 310 equidistant from the protrusions 281 and the edges of the pixel electrode 190 adjacent thereto. Accordingly, the LC molecules 310 far from the protrusions 281 as well as those close to the protrusions 281 and the edges of the pixel electrodes 190 show short response time, thereby increasing the luminance thereof.

Many of the above-described features of the LCD shown in FIGS. 1-5 may be appropriate to the LCD shown in FIGS. 17-20.

LCDs according to other embodiments of the present invention will be described in detail with reference to FIGS. 21-25.

Figure 21:
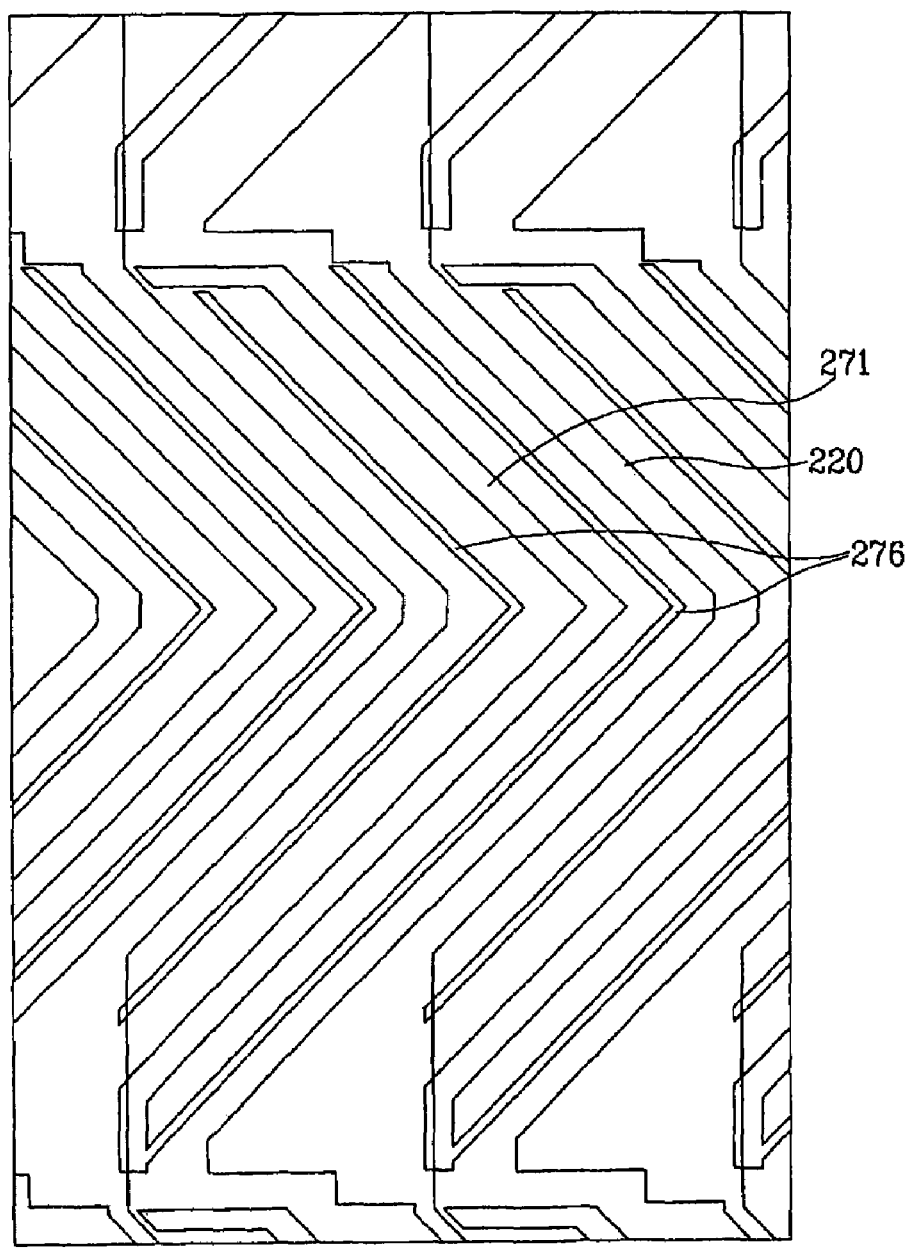
FIG. 21 is a layout view of a common electrode panel according to another embodiment of the present invention.
Figure 22:
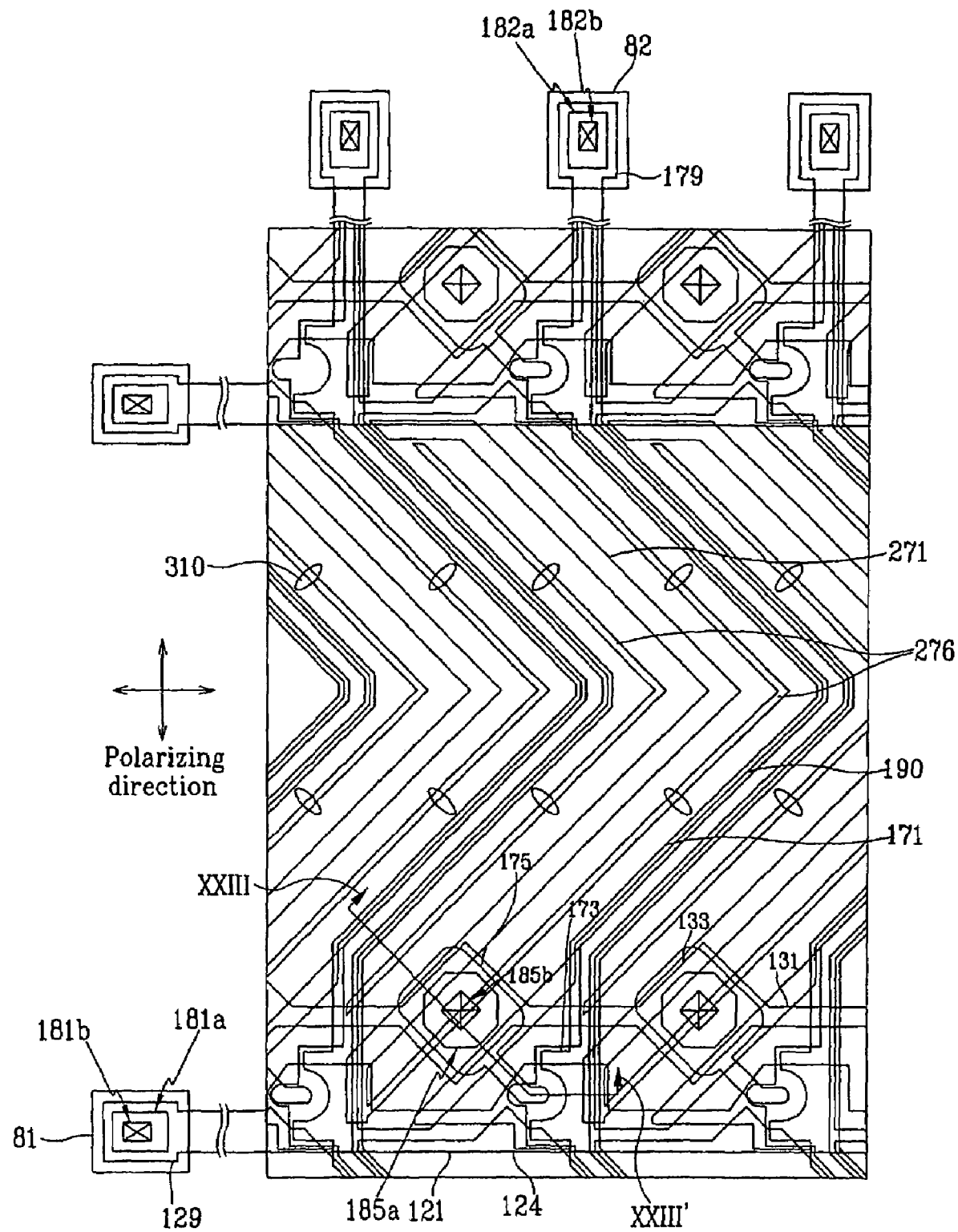
FIG. 22 is a layout view of an LCD including the common electrode panel shown in FIG. 21.
Figure 23:
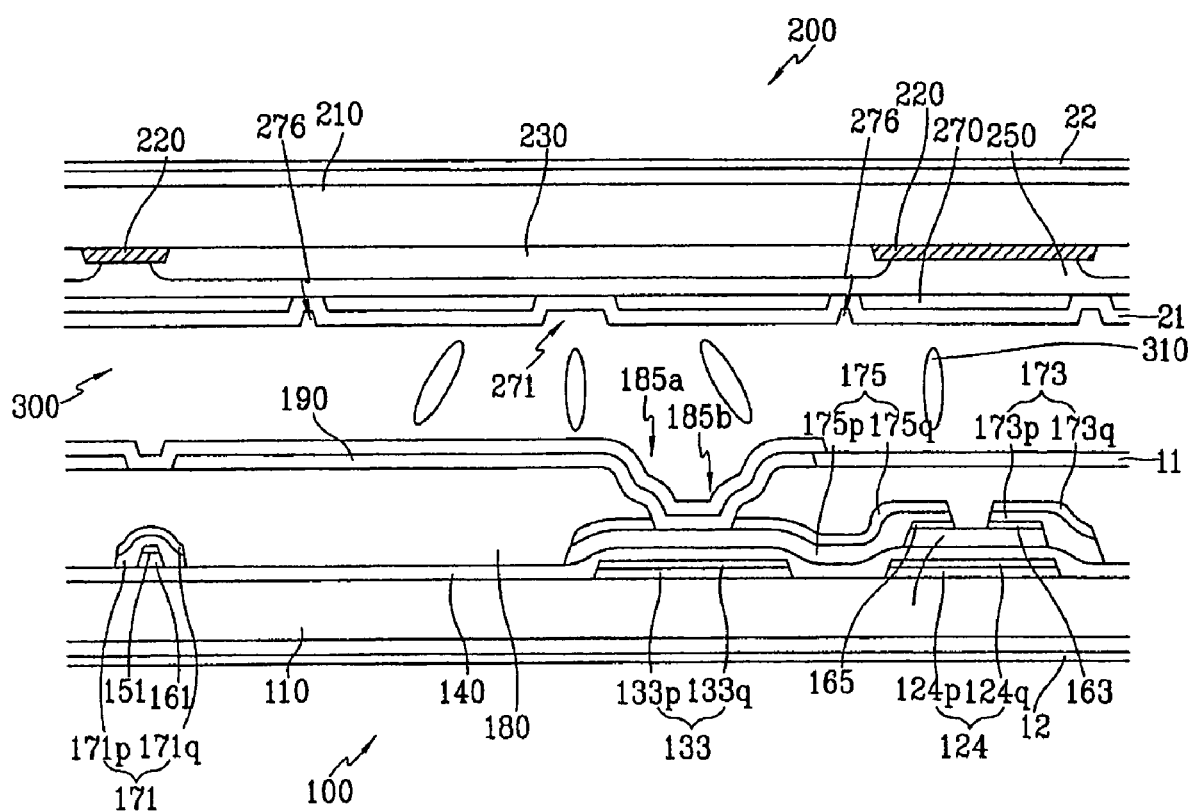
FIG. 23 is a sectional view of the LCD shown in FIG. 22 taken along the line XXIII-XXIII'.

FIG. 21 is a layout view of a common electrode panel according to another embodiment of the present invention, FIG. 22 is a layout view of an LCD including the common electrode panel shown in FIG. 21, and FIG. 23 is a sectional view of the LCD shown in FIG. 22 taken along the line XXIII-XXIII'.

Referring to FIGS. 21-23, an LCD according to this embodiment also includes a TFT array panel 100, a common electrode panel 200, and a LC layer 300 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 185b are provided at the passivation layer 180 and the gate insulating layer 140. A plurality of pixel electrodes 190 and a plurality of contact assistants 81 and 82 are formed on the passivation layer 180 and an alignment layer 11 is coated thereon.

Regarding the common electrode panel 200, a light blocking member 220, a plurality of color filters 230, an overcoat 250, a common electrode 270 having a plurality of regular cutouts 271 and fine cutouts 276, and an alignment layer 21 are formed on an insulating substrate 210.

Different from the LCD shown in FIGS. 1-5, each fine cutout 276 facing a pixel electrode 190 is substantially equidistant from a regular cutout 271 facing the pixel electrode 190 and an edge of the pixel electrode 190. It is preferable that the width of the fine cutouts 276 is in a range of about 2-5 microns.

A fine cutout 276 generates a weak horizontal component in an electric field such that the LC molecules 310 near the fine cutout 276 determine their tilt directions along the horizontal component among various directions. Accordingly, the tilt of the LC molecules 310 due to the fine cutout 276 is performed in two opposite directions and the random tilt of the LC molecules 310 that increases the response time is reduced. In addition, since the tilt due to the fine cutout 276 is relatively small compared with the primary tilt due to the regular cutout 271 and the edge of the pixel electrode 190, the resultant tilt direction of the LC molecules 271 may be equal to the primary tilt direction and the time that the LC molecules 310 once tilted by the fine cutouts 276 in an opposite direction to the primary tilt direction become tilted again in the primary tilt direction may be short. Accordingly, the fine cutouts 276 reduce the response time without generating light leakage near the fine cutouts 276 and thus without reducing the aperture ratio.

Many of the above-described features of the LCD shown in FIGS. 1-5 may be appropriate to the LCD shown in FIGS. 21-23.

Examples of the modification of the LCD shown in FIGS. 21-23 will be described in detail with reference to FIGS. 24-27.

Figure 24:
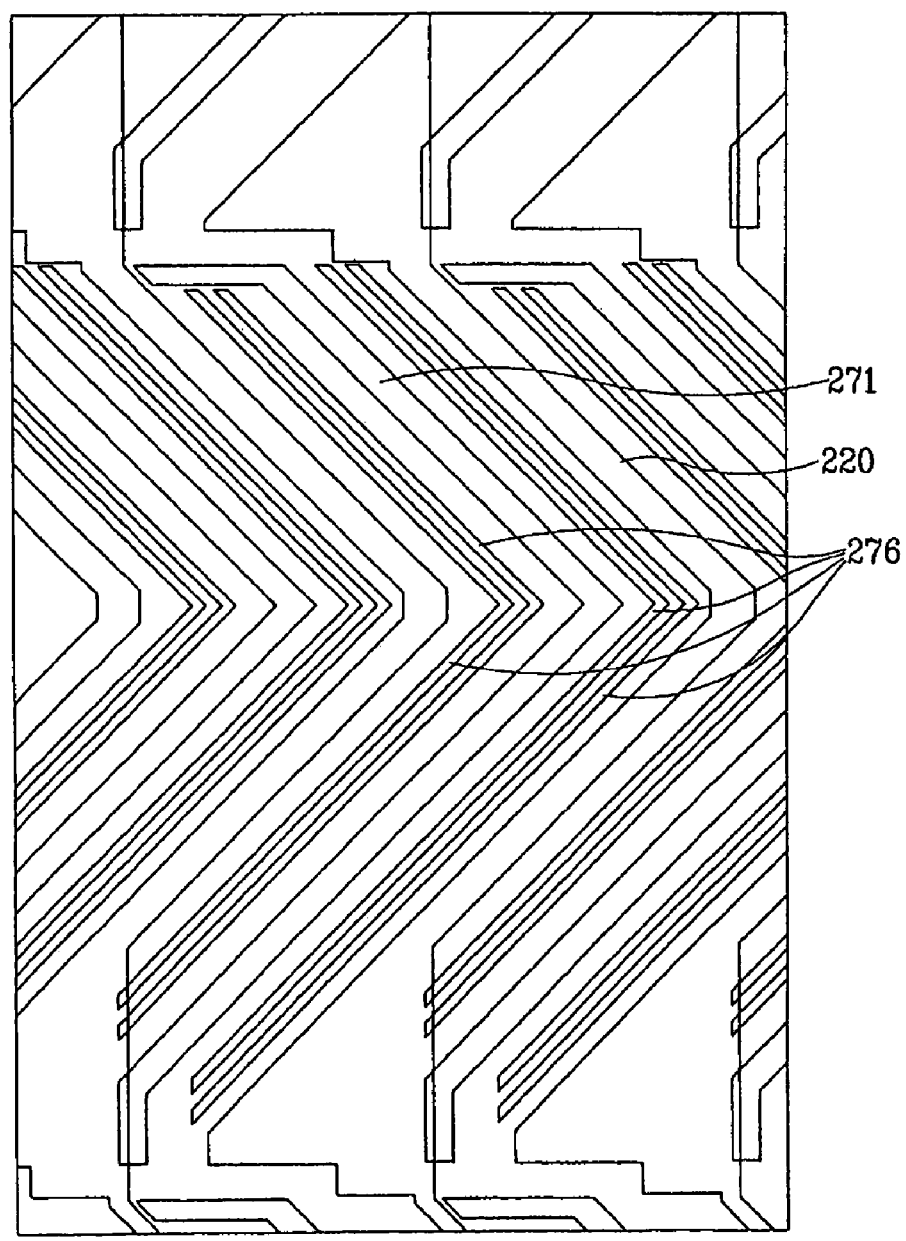
FIG. 24 is a layout view of a common electrode panel according to another embodiment of the present invention.
Figure 25:
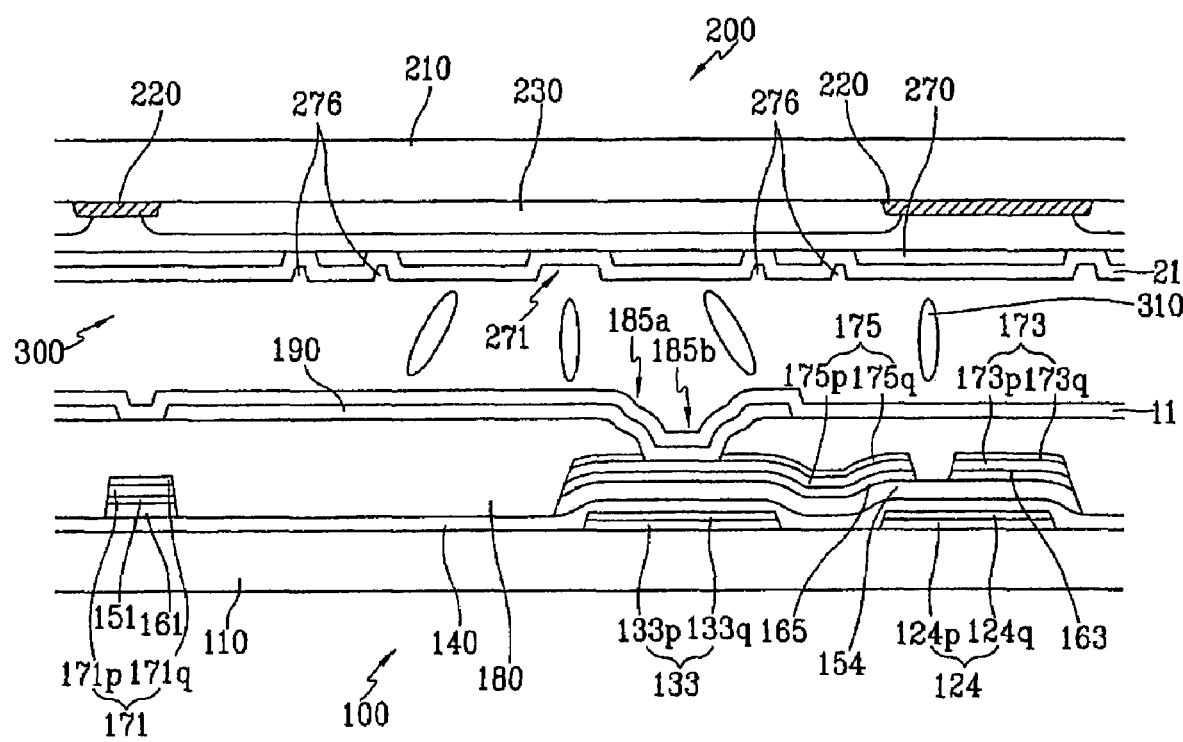
FIG. 25 is a sectional view of an LCD including the common electrode panel shown in FIG. 24.

FIG. 24 is a layout view of a common electrode panel according to another embodiment of the present invention, and FIG. 25 is a sectional view of an LCD including the common electrode panel shown in FIG. 24.

Referring to FIGS. 24 and 25, a pair of fine cutouts 276 that are disposed between a regular cutout 271 and an edge of a pixel electrode 190 are substantially equidistant from the regular cutout 271 and the edge of the pixel electrode 190. Many of the above-described features of the LCD shown in FIGS. 21-23 and of the LCD shown in FIGS. 8-11 may be appropriate to the LCD shown in FIGS. 24 and 25.

Figure 26:
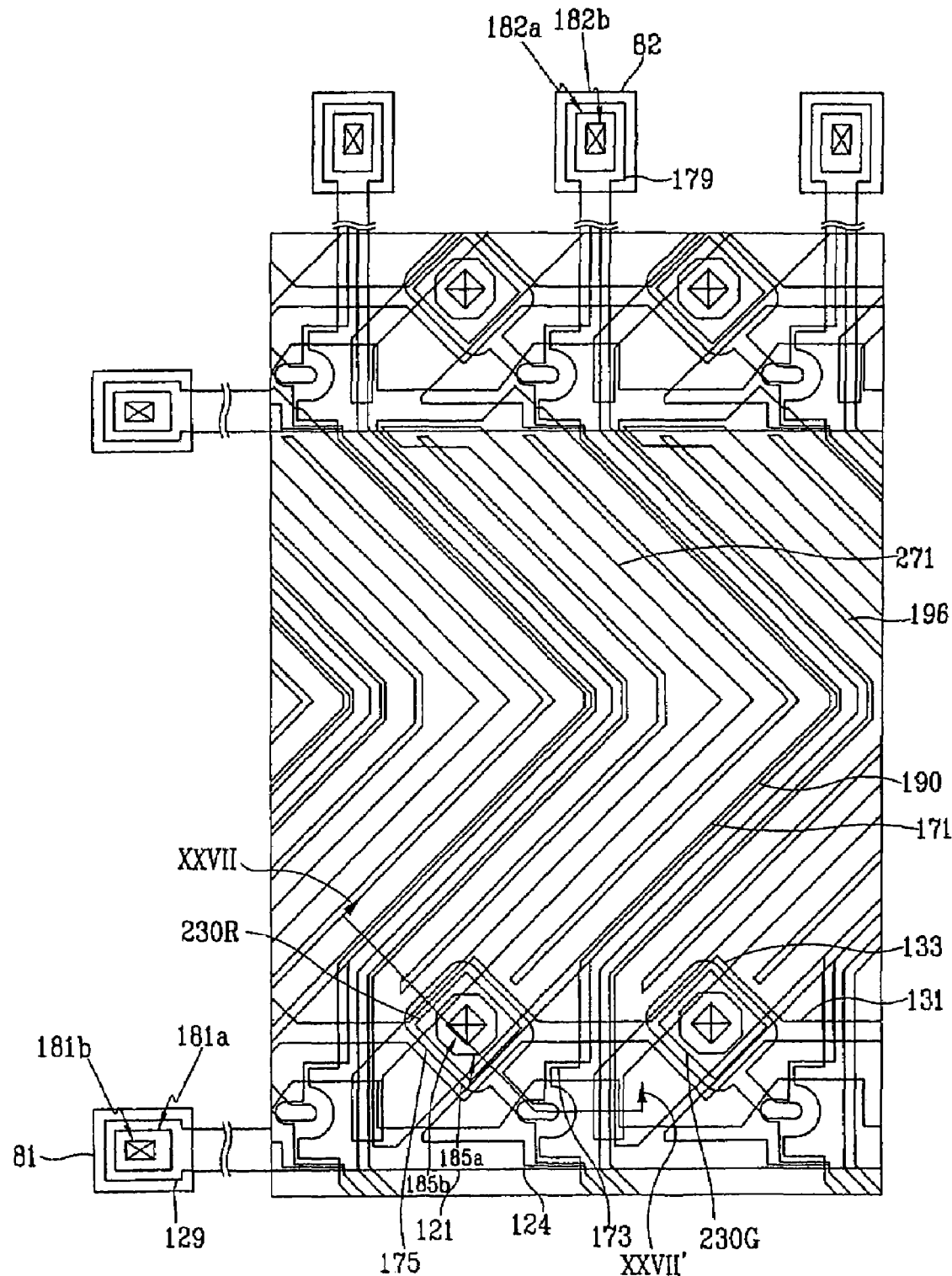
FIG. 26 is a layout view of a common electrode panel according to another embodiment of the present invention.
Figure 27:
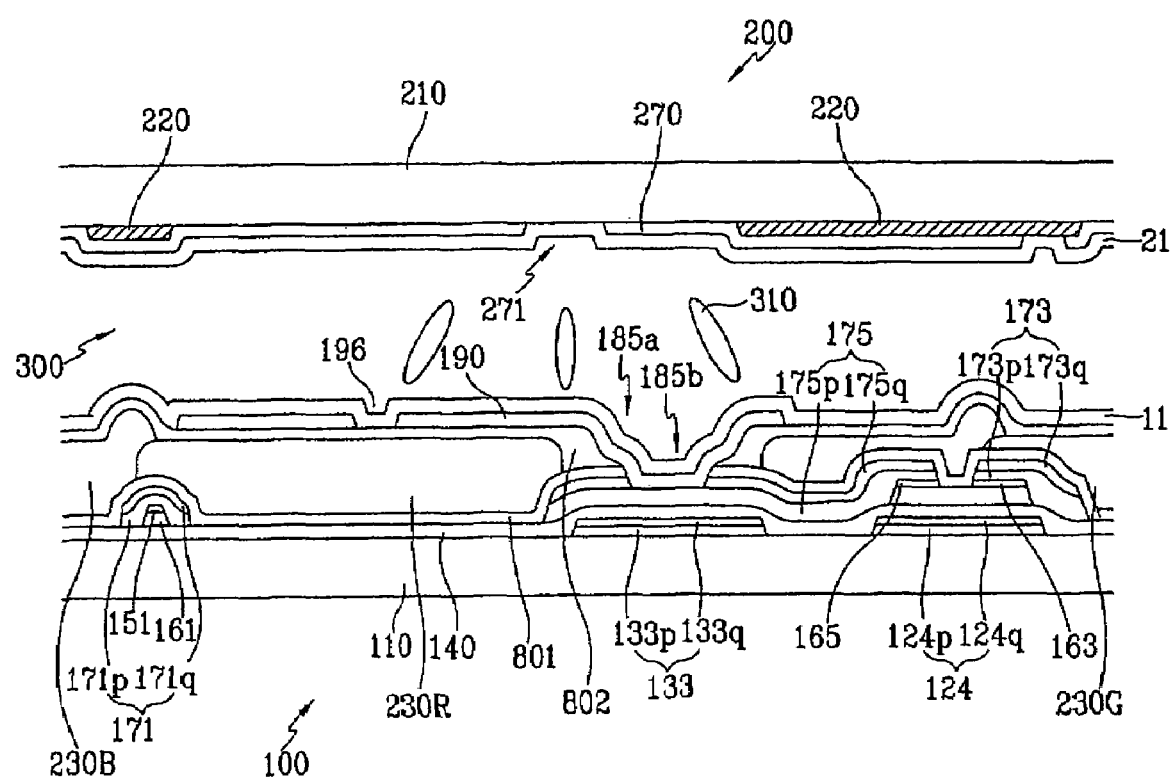
FIG. 27 is a sectional view of an LCD including the common electrode panel shown in FIG. 26.

FIG. 26 is a layout view of a common electrode panel according to another embodiment of the present invention, and FIG. 27 is a sectional view of an LCD including the common electrode panel shown in FIG. 26.

Referring to FIGS. 26 and 27, each pixel electrode 190 includes a pair of fine cutouts 196 and each fine cutout 276 is substantially equidistant from a regular cutout 271 facing the pixel electrode 190 and the edge of the pixel electrode 190. Many of the above-described features of the LCD shown in FIGS. 21-23 and of the LCD shown in FIGS. 14-16 may be appropriate to the LCD shown in FIGS. 26 and 27.

An LCD according to another embodiment of the present invention will be described in detail with reference to FIGS. 28-31.

Figure 28:
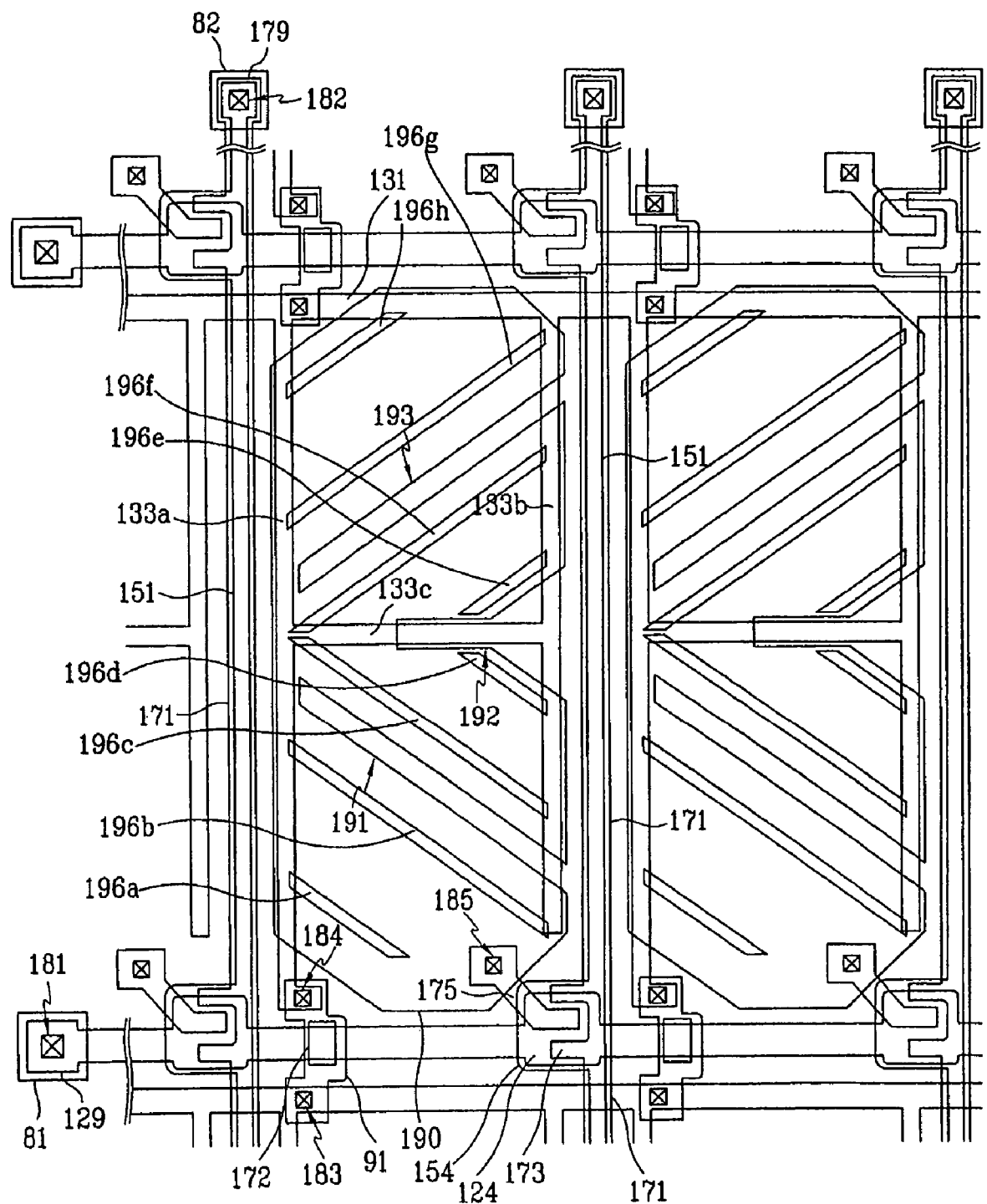
FIG. 28 is a layout view of a TFT array panel of an LCD according to an embodiment of the present invention.
Figure 29:
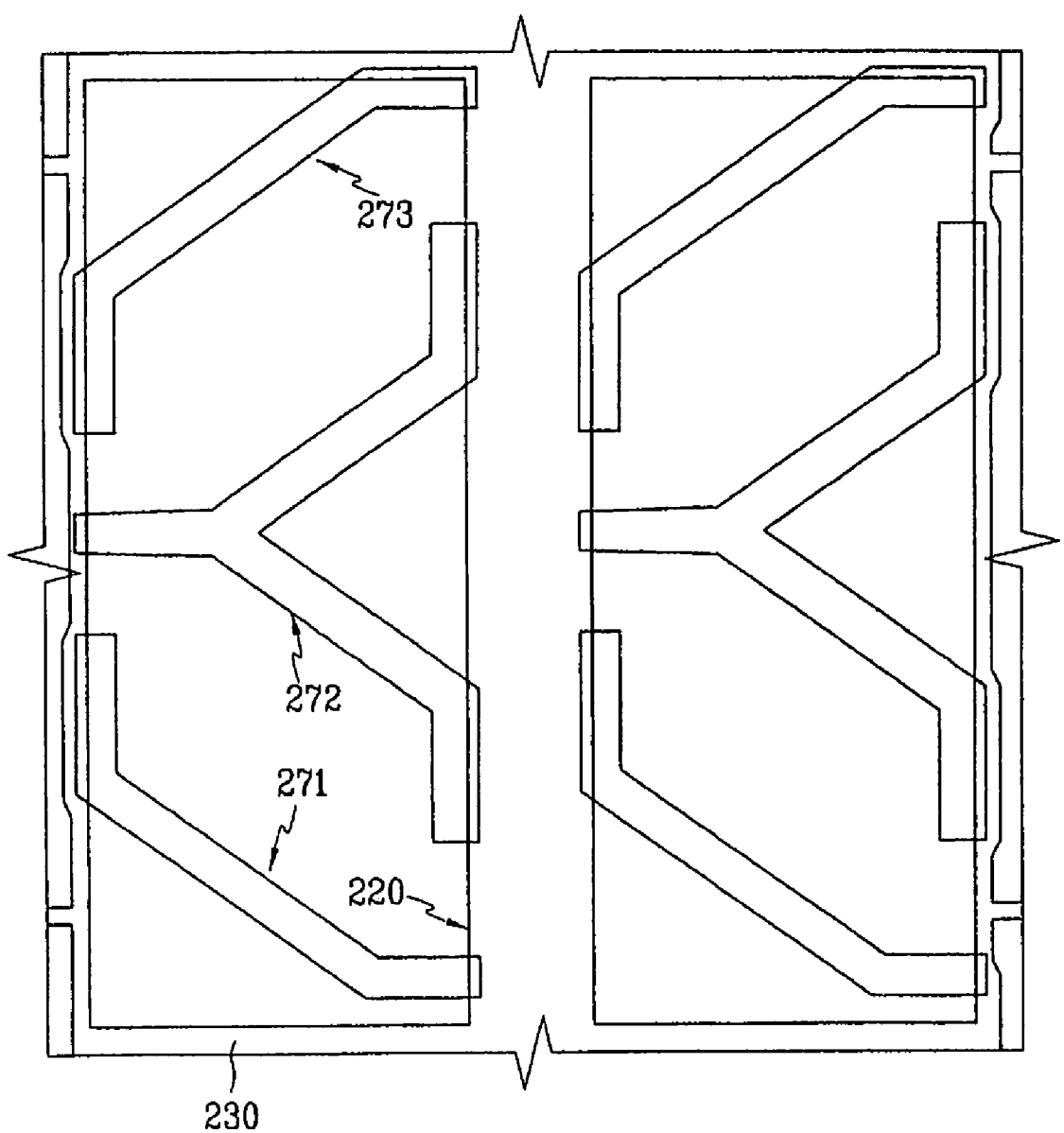
FIG. 29 is a layout view of a common electrode panel of an LCD according to an embodiment of the present invention.
Figure 30:
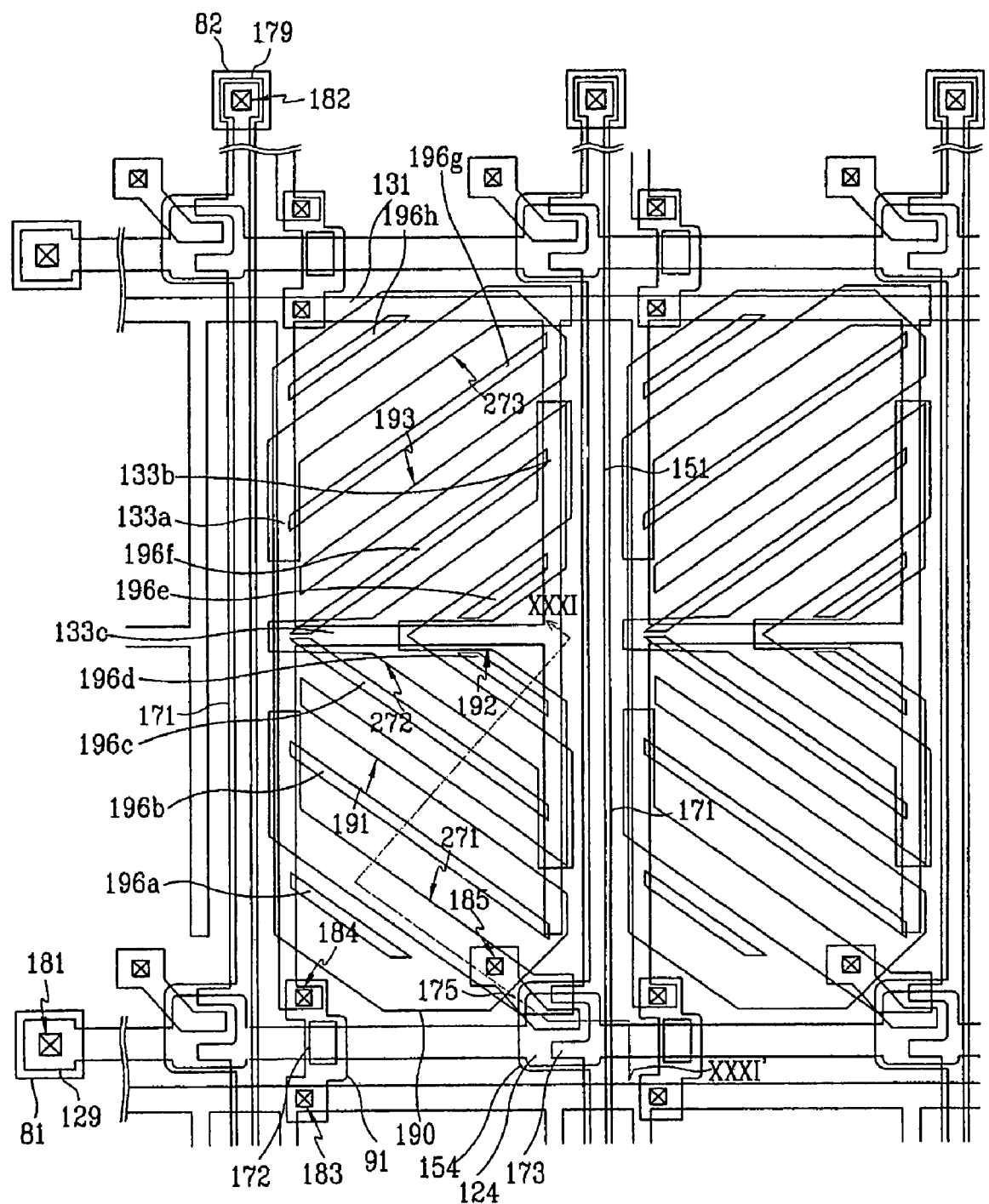
FIG. 30 is a layout view of an LCD including the TFT array panel shown in FIG. 28 and the common electrode panel shown in FIG. 29.
Figure 31:
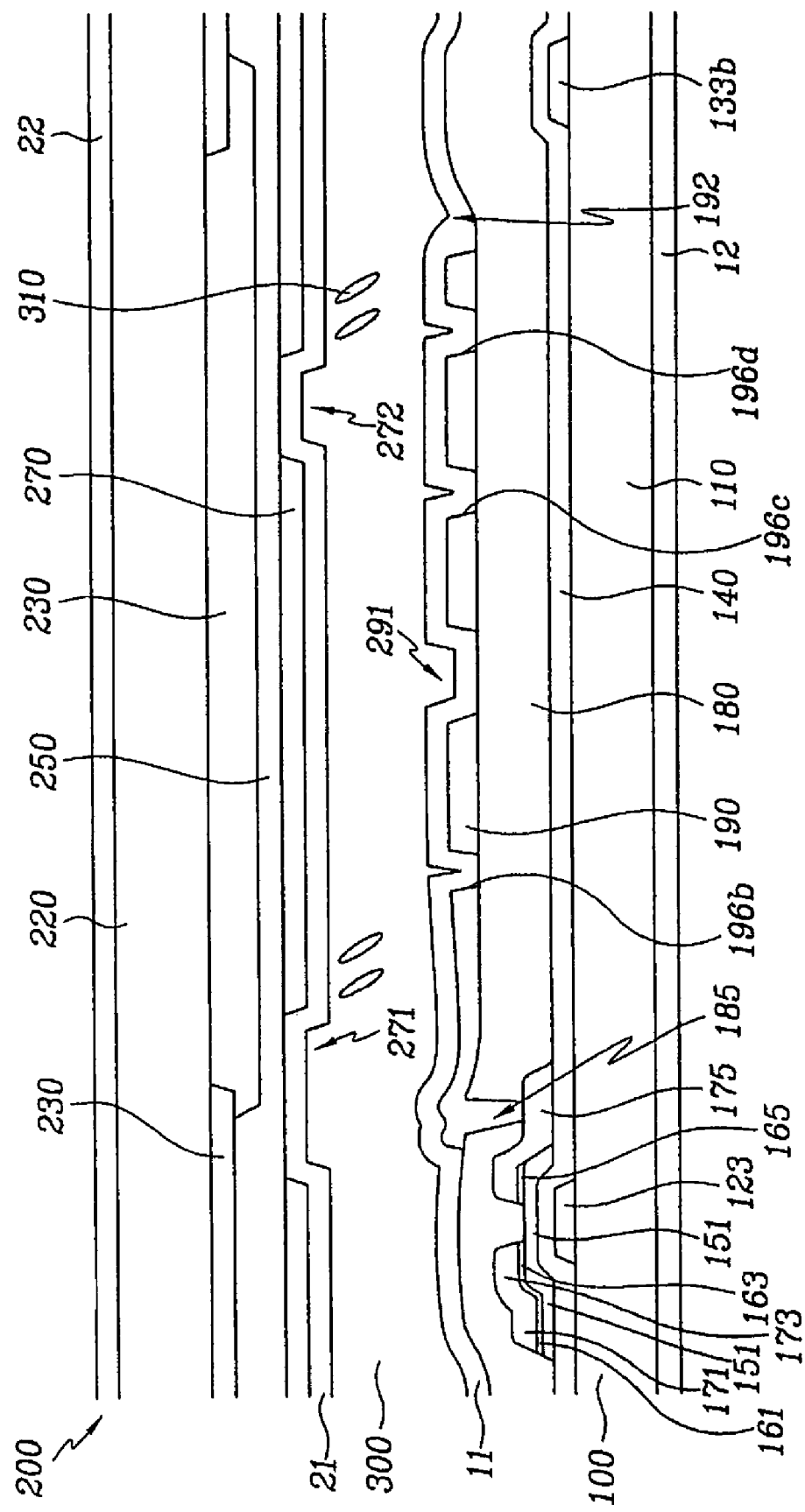
FIG. 31 is a sectional view of the LCD shown in FIG. 30 taken along the line XXXI-XXXI'.

FIG. 28 is a layout view of a TFT array panel of an LCD according to an embodiment of the present invention, FIG. 29 is a layout view of a common electrode panel of an LCD according to an embodiment of the present invention, FIG. 30 is a layout view of an LCD including the TFT array panel shown in FIG. 28 and the common electrode panel shown in FIG. 29, and FIG. 31 is a sectional view of the LCD shown in FIG. 30 taken along the line XXXI-XXXI'.

An LCD according to this embodiment includes a TFT array panel 100, a common electrode panel 200, and a LC layer 300 interposed between the panels 100 and 200 and containing a plurality of LC molecules 310 aligned substantially vertical to surfaces of the panels 100 and 200.

The TFT array panel 100 is now described in detail with reference FIGS. 28, 30 and 31.

A plurality of gate lines 121 and a plurality of storage electrode lines 131 are formed on an insulating substrate 110 such as transparent glass.

The gate lines 121 extend substantially in a transverse direction and are separated from each other. Each gate line 121 includes a plurality of projections forming a plurality of gate electrodes 124 and an end portion 129 having a large area for connection with an external driving circuit.

Each storage electrode line 131 extends substantially in the transverse direction and includes a plurality of sets of two longitudinal branches forming first and second storage electrodes 133a and 133b and a transverse branch forming a third storage electrode 133c connected between the first storage electrode 133a and the second storage electrode 133b. Each of the first storage electrodes 133a has a free end portion and a fixed end portion connected to the storage electrode line 131, and the fixed end portion has a projection. Each of the third storage electrodes 133c forms a mid-line between two adjacent gate lines 121. The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon or polysilicon are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171, a plurality of drain electrodes 175 separated from the data lines 171, and a plurality of isolated metal pieces 172 are formed on the ohmic contacts 161 and 165 and the gate insulating layer 140.

The data lines 171 extend substantially in the longitudinal direction and intersect the gate lines 121 and the storage electrode lines 131. Each data line 171 is disposed between the first and the second storage electrodes 133a and 133b in adjacent sets of the branches 133a-133c of the storage electrode lines 131 and it includes an end portion 179 having a large area for contact with another layer or an external device. A plurality of branches of each data line 171, which project toward the drain electrodes 175, form a plurality of source electrodes 173. Each drain electrode 175 includes an end portion having a large area for contact with another layer and each source electrode 173 is curved to partly enclose another end portion of the drain electrode 175. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 172 are disposed on the gate lines 121 near the end portions of the storage electrodes 133*a*.

The data lines 171, the drain electrodes 175, and the metal pieces 172 are preferably made of refractory metal such as Cr, Mo containing metal, and Ti, or Al containing metal and they may also have a multilayered structure including a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181, 183 and 184 exposing the end portions 129 of the gate lines 121, portions of the storage electrode lines 131 near the fixed end portions of the first storage electrodes 133*a*, and the projections of the free end portions of the first storage electrodes 133*a*, respectively. The contact holes 181-185 have a shape of polygon or a circle, and sidewalls of the contact holes 181-185 are tapered. Each of the contact holes 181 and 182 exposing the end portions 129 and 179 preferably has an area ranging from about 0.5 mm×15 µm to about 2 mm×60 µm.

A plurality of pixel electrodes 190, a plurality of contact assistants 81 and 82, and a plurality of storage connections 91, which are preferably made of ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175.

Each pixel electrode 190 has substantially a shape of a rectangle having chamfered corners and the chamfered edges of the pixel electrode 190 make an angle of about 45 degrees with the gate lines 121.

Each pixel electrode 190 has a plurality of regular cutouts 191-193 and a plurality of fine cutouts 196*a*-196*h*. The regular cutouts 191-193 include a lower cutout 191, a center cutout 192, and an upper cutout 193, which partition the pixel electrode 190 into a plurality of partitions. The fine cutouts 196*a*-196*h* include four lower cutouts 196*a*-196*d* extending parallel to the lower regular cutout 191 and four upper cutouts 196*e*-196*h* extending parallel to the upper regular cutout 193. The cutouts 191-193 and 196*a*-196*h* substantially have inversion symmetry with respect to a third storage electrode 133*c*.

The lower and the upper cutouts 191 and 193 obliquely extend approximately from a right edge of the pixel electrode 190 approximately to a left edge of the pixel electrode 190, and they are disposed at lower and upper halves of the pixel electrode 190, respectively, which can be divided by the third storage electrode 133*c*. The lower and the upper cutouts 191 and 193 make an angle of about 45 degrees to the gate lines 121, and they extend perpendicular to each other.

The center cutout 192 extends along the third storage electrode 133*c* and has an inlet from the right edge of the pixel electrode 190, which has a pair of inclined edges substantially parallel to the lower cutout 191 and the upper cutout 193, respectively.

Accordingly, the lower half of the pixel electrode 190 is partitioned into two lower partitions by the lower cutout 191 and the upper half of the pixel electrode 190 is also partitioned into two upper partitions by the upper cutout 193. The number of partitions or the number of the cutouts is varied depending on the design factors such as the size of pixels, the ratio of the transverse edges and the longitudinal edges of the pixel electrodes, the type and characteristics of the liquid crystal layer 300, and so on.

The contact assistants 81 and 82 are connected to the end portions 129 of the gate lines 121 and the end portions 179 of the data lines 171 through the contact holes 181 and 182, respectively. The contact assistants 81 and 82 are not requisites but preferred to protect the end portions 129 and 179 and to complement the adhesiveness of the end portions 129 and 179 and external devices.

The storage connections 91 cross over the gate lines 121 and they are connected to the exposed projection of the fixed end portions of the first storage electrodes 133*a* and the exposed portions of the storage electrode lines 131 respectively through the contact holes 183 and 184 opposite each other with respect to the gate lines 121. The storage connections 91 overlaps the metal pieces 172 and they may be electrically connected to the metal pieces 172. The storage electrode lines 131 including the storage electrodes 133*a*-133*c* along with the storage connections 91 and the metal pieces 172 are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the storage connections 91 by a laser beam to electrically connect the gate lines 121 to the storage connections 91. In this case, the metal pieces 172 enhance the electrical connection between the gate lines 121 and the storage connections 91.

The description of the common electrode panel 200 follows with reference to FIGS. 29-31.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190. Otherwise, the light blocking member 220 may include linear portions corresponding to the data lines 171 and other portions corresponding to the TFTs.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 is formed on the color filters 230.

A common electrode 270 preferably made of transparent conductive material such as ITO and IZO is formed on the overcoat 250.

The common electrode 270 has a plurality of sets of regular cutouts 271-273.

A set of cutouts 271-273 face a pixel electrode 190 and include a lower cutout 271, a center cutout 272, and an upper cutout 273. Each of the cutouts 271-273 is disposed between adjacent regular cutouts 191-193 of the pixel electrode 190 or between a cutout 191 or 193 and a chamfered edge of the pixel electrode 190. In addition, each of the fine cutouts 196a-196h is substantially equidistant from adjacent two of the regular cutouts 191-193 and 271-273 and the chamfered edges of the pixel electrode 190. Each of the cutouts 271-273 has at least an oblique portion extending parallel to the lower cutout 191 or the upper cutout 193 of the pixel electrode 190, and the distances between adjacent two of the cutouts 271-273 and 191-193, the oblique portions thereof, the oblique edges thereof, and the chamfered edges of the pixel electrode 190, which are parallel to each other, are substantially the same. The cutouts 271-273 substantially have inversion symmetry with respect to a third storage electrode 133c.

Each of the lower and upper cutouts 271 and 273 includes an oblique portion extending approximately from a left edge of the pixel electrode 190 approximately to a lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center cutout 272 includes a central transverse portion extending approximately from the left edge of the pixel electrode 190 along the third storage electrode 133c, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts 271-273 may be varied depending on the design factors, and the light blocking member 220 may also overlap the cutouts 271-273 to block the light leakage through the cutouts 271-273.

Homeotropic alignment layers 11 and 21 are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating the retardation of the LC layer 300.

The LC molecules 310 in the LC layer 300 are aligned such that their long axes are vertical to the surfaces of the panels 100 and 200. The liquid crystal layer 300 has negative dielectric anisotropy.

The regular cutouts 191-193 and 271-273 control the tilt directions of the LC molecules in the LC layer 300. That is, the liquid crystal molecules in each region called domain defined by adjacent cutouts 191-193 and 271-273 or by the cutout 272 or 273 and the chamfered edge of the pixel electrode 190 are tilted in a direction perpendicular to the extension direction of the cutouts 191-193 and 271-273. It is apparent that the domains have two long edges extending substantially parallel to each other and making an angle of about 45 degrees with the gate line 121.

As described above, the fine cutouts 196a-196h reduce the response time without generating light leakage near the fine cutouts 196a-196h and thus without reducing the aperture ratio.

At lease one of the cutouts 191-193, 271-273 and 196a-196h can be substituted with protrusions or depressions.

The shapes and the arrangements of the cutouts 191-193, 271-273 and 196a-196h may be modified.

As described above, the fine cutouts or the lower portions of the protrusions reduce the response time without reducing the aperture ratio. In addition, the curved edges of the pixel electrodes make the lateral field between the pixel electrodes enhance the stability of the domains. Furthermore, since the polarizers can be attached such that the transmissive axes of the polarizers are parallel to or perpendicular to the edges of the panels, the production cost is reduced with a maximum transmittance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
    a substrate; successive
    a first signal line formed on the substrate;
    a second signal line formed on the substrate and intersecting the first signal line;
    a thin film transistor connected to the first and the second signal lines;
    a pixel electrode connected to the thin film transistor;
    a regular domain defining member partitioning the pixel electrode into a plurality of partitions; and
    a subsidiary domain defining member extending substantially parallel to the regular domain defining member, disposed near an edge or a middle of the partitions, and disposed adjacent the regular domain defining member away from a midpoint between the regular domain defining member and a successive regular domain defining member, wherein the width of the subsidiary domain defining member is smaller than the width of the regular domain defining member.

2. The thin film transistor array panel of claim 1, wherein the second signal line includes a plurality of curved portions and intermediate portions intersecting the first signal line and alternately arranged by a predetermined interval.

3. The thin film transistor array panel of claim 2, wherein each of the curved portions of the second signal line comprises at least a pair of rectilinear portions connected to each other and making an angle of about 45 degrees.

4. The thin film transistor array panel of claim 1 wherein the regular domain defining member has an inversion symmetry with respect to a transverse line bisecting the pixel electrode into lower and upper portions.

5. The thin film transistor array panel of claim 4, wherein the regular domain defining member makes an angle of about 45 degrees with the first signal line.

6. The thin film transistor array panel of claim 1, wherein the subsidiary domain defining member comprises a fine cutout in the pixel electrode, or a protrusion or a stepped portion of a protrusion on the pixel electrode.

7. The thin film transistor array panel of claim 1, wherein the regular domain defining member comprises a cutout in the pixel electrode or a protrusion on the pixel electrode.

8. The thin film transistor array panel of claim 1, further comprising a third signal line formed on the substrate, extending substantially parallel to the first signal line, and overlapping the pixel electrode or a terminal of the thin film transistor connected to the pixel electrode to form a storage capacitor.

9. The thin film transistor array panel of claim 1, wherein the regular domain defining member and the subsidiary domain defining member are formed on the substrate.

10. The thin film transistor array panel of claim 1, wherein a distance between the regular domain defining member and the subsidiary domain defining member ranges from about 2 microns to about 5 microns.

11. A common electrode panel comprising:
a substrate;
a light blocking member formed on the substrate and defining an open area;
a common electrode formed on an entire surface of the substrate;
a regular domain defining member formed on or in the common electrode and partitioning the open area into a plurality of partitions; and
a subsidiary domain defining member formed on or in the common electrode and extending along a shape of the partitions, disposed near an edge or a middle of the partitions, and disposed adjacent the regular domain defining member away from a midpoint between the regular domain defining member and a successive regular domain defining member, wherein the width of the subsidiary domain defining member is smaller than the width of the regular domain defining member.

12. The common electrode panel of claim 11, wherein the subsidiary domain defining member comprises a fine cutout in the common electrode, or a protrusion or a stepped portion of a protrusion on the common electrode.

13. The common electrode panel of claim 11, wherein the regular domain defining member comprises a cutout in the common electrode or a protrusion on the common electrode.

14. A liquid crystal display comprising:
a first substrate;
a first signal line formed on the substrate;
a second line formed on the substrate and intersecting the first signal line;
a thin film transistor connected to the first and the second signal lines;
a pixel electrode connected to the thin film transistor;
a second substrate facing the first substrate;
a common electrode formed on the second substrate;
a regular region partitioning member formed on at least one of the first and the second substrates and partitioning the pixel electrode into a plurality of partitions;
a subsidiary region partitioning member formed on at least one of the first and the second substrates, extending along a shape of the partitions, disposed near an edge of the partitions, and disposed adjacent the regular region partitioning member away from a midpoint between the regular region partitioning member and a successive regular region partitioning member; and
a liquid crystal layer disposed between the first substrate and the second substrate and partitioned into a plurality of tilt regions disposed on the partitions, respectively, wherein the width of the subsidiary region partitioning member is smaller than the width of the regular region partitioning member.

15. The liquid crystal display of claim 14, wherein the liquid crystal layer has negative dielectric anisotropy and is subjected to vertical alignment.

16. The liquid crystal display of claim 14, wherein the second signal line has a curved portion, and each of the partitions have a major edge parallel to the curved portion of the second signal line.

17. The liquid crystal display of claim 14, wherein the subsidiary region partitioning member comprises a fine cutout in the pixel electrode or be common electrode, or a protrusion or a stepped portion of a protrusion on the pixel electrode or the common electrode.

18. The liquid crystal display of claim 17, wherein the fine cutout has a width ranging about 2 microns to about 5 microns.

19. The liquid crystal display of claim 14, wherein the regular region partitioning member comprises a cutout in the pixel electrode or the common electrode.

20. The liquid crystal display of claim 14, wherein the regular region partitioning member comprises a protrusion in the pixel electrode or the common electrode.

* * * * *